(12) United States Patent
Ying et al.

(10) Patent No.: US 10,484,976 B2
(45) Date of Patent: Nov. 19, 2019

(54) SIGNALING, PROCEDURES, USER EQUIPMENT AND BASE STATIONS FOR UPLINK ULTRA RELIABLE LOW LATENCY COMMUNICATIONS

(71) Applicants: Sharp Kabushiki Kaisha, Sakai-ku, Sakai, Osaka (JP); FG Innovation Company Limited, New Territories, Hong Kong (CN)

(72) Inventors: Kai Ying, Vancouver, WA (US); Toshizo Nogami, Vancouver, WA (US); Tatsushi Aiba, Vancouver, WA (US); John Michael Kowalski, Vancouver, WA (US); Zhanping Yin, Vancouver, WA (US); Jia Sheng, Vancouver, WA (US)

(73) Assignees: Sharp Kabushiki Kaisha, Osaka (JP); FG Innovation Company Limited, Hong Kong (CN)

(*) Notice: Subject to any disclaimer, the term of this patent is extended or adjusted under 35 U.S.C. 154(b) by 0 days.

(21) Appl. No.: 15/860,962

(22) Filed: Jan. 3, 2018

(65) Prior Publication Data

US 2018/0199334 A1 Jul. 12, 2018

Related U.S. Application Data

(63) Continuation of application No. PCT/US2018/012039, filed on Jan. 2, 2018.
(Continued)

(51) Int. Cl.
*H04W 72/04* (2009.01)
*H04W 4/70* (2018.01)
(Continued)

(52) U.S. Cl.
CPC ....... *H04W 72/0413* (2013.01); *H04L 5/0053* (2013.01); *H04L 5/0098* (2013.01);
(Continued)

(58) Field of Classification Search
CPC ... H04L 5/0053; H04L 5/0098; H04L 5/0055; H04W 72/0413; H04W 72/042; H04W 48/12; H04W 4/70; H04J 2211/006
See application file for complete search history.

(56) References Cited

U.S. PATENT DOCUMENTS 10,080,228 B2* 9/2018 Ouchi .................... H04B 1/713
2016/0150532 A1* 5/2016 Bhushan ............... H04L 1/1812
370/336
(Continued)

OTHER PUBLICATIONS

Catt,"Feedback for SPS PDCCH connnnand,"3GPP TSG RAN WG2 #92, Anaheim, USA, R2-156256, Nov. 20, 2015, XP051005752, Retrieved from: URL:http://www.3gpp.org/ftp/Meetings_3GPP_SYNC/RAN2/Docs/.*
(Continued)

*Primary Examiner* — Afsar M Qureshi
(74) *Attorney, Agent, or Firm* — Austin Rapp

(57) ABSTRACT

A user equipment (UE) is described that includes receiving circuitry configured to receive, from a base station apparatus, a radio resource control message including first information used for configuring a periodicity for an uplink data transmission, the receiving circuitry configured to receive on a physical downlink control channel, from the base station apparatus, second information used for indicating an activation for the uplink data transmission. Transmitting circuitry is configured to transmit, to the base station apparatus, confirmation information Medium Access Control (MAC) Control Element (CE) for the second information, the transmitting circuitry configured to perform on a physical uplink shared channel, to the base station apparatus, the uplink data transmission based on the first information and the second information. The receiving circuitry is also configured to receive on the physical downlink control channel, from the base station apparatus, third information used for indicating a deactivation for the uplink data transmission.

4 Claims, 21 Drawing Sheets

Related U.S. Application Data

(60) Provisional application No. 62/443,464, filed on Jan. 6, 2017.

(51) Int. Cl.
 H04W 48/12 (2009.01)
 H04L 5/00 (2006.01)

(52) U.S. Cl.
 CPC ............ H04W 4/70 (2018.02); H04W 48/12 (2013.01); H04W 72/042 (2013.01); H04J 2211/006 (2013.01); H04L 5/0055 (2013.01)

(56) References Cited

U.S. PATENT DOCUMENTS

| | | | | |
|---|---|---|---|---|
| 2016/0380742 | A1* | 12/2016 | Suzuki | H04L 5/001 370/280 |
| 2017/0215186 | A1* | 7/2017 | Chen | H04W 72/0446 |
| 2018/0083758 | A1* | 3/2018 | Islam | H04L 5/0083 |

OTHER PUBLICATIONS

International Search Report and Written Opinion issued for PCT Application No. PCT/US2018/012039 dated Mar. 26, 2018.
Catt, "Feedback for SPS PDCCH command," 3GPP TSG RAN WG2 #92, Anaheim, USA, R2-156256, Nov. 20, 2015.
Nokia, Alcatel-Lucent Shanghai Bell, "Skipping empty BSR and feedback for SPS activiation/deactiviation," 3GPP TSG-RAN WG2 Meeting #93bis, Dubrovnik, Croatia, R2-162504, Apr. 15, 2016.
3GPP TR 38.913 v03.0, "Study on Scenarios and Requirements for Next Generation Access Technologies (Release 14)," Mar. 2016.
3GPP TR 22.862 v1.0.0, "Feasibility Study on New Services and Markets Technology Enablers Critical Communications; Stage 1 (Release 14)," Feb. 2016.
Huawei, HiSilicon, "Overview of URLLC support in NR", 3GPP TSG RAN WG1 meeting #86bis, Lisbon, Portugal, R1-1608843, Oct. 14, 2016.
"RAN1 Chairman's Notes," 3GPP TSG RAN WG1 Meeting #86bis, Lisbon, Portugal Oct. 14, 2016.
3GPP TS 36331, V14.0.0, Evolved Universal Terrestrial Radio Access (E-UTRA); Radio Resource Control (RRC); Protocol specification (Release 14) Sep. 2016.
3GPP TS 36321, V14.0.0, Evolved Universal Terrestrial Radio Access (E-UTRA); Medium Access Control (MAC); Protocol specification (Release 14) Sep. 2016.
Huawei, HiSilicon, "Overview of UL URLLC Support in NR," 3GPP TSG-RAN WG1 Meeting #87, Reno, USA, R1-1611220, Nov. 18, 2016.
Nokia, Alcatel-Lucent Shanghai Bell, "Enhanced semi-persistent scheduling for 5G URLLC," 3GPP TSG RAN WG1 #87, Reno, USA, R1-1612251, Nov. 18, 2016.
LG Electronics, "Discussion on control and data transmission of URLLC", 3GPP TSG RAN WG1 Meeting #87, Reno, USA, R1-1611850, Nov. 18, 2016.
3GPP TS 36.213 V14.0.0, Evolved Universal Terrestrial Radio Access (E-UTRA); Physical layer procedures (Release 14), Sep. 2016.

\* cited by examiner

SIGNALING, PROCEDURES, USER EQUIPMENT AND BASE STATIONS FOR UPLINK ULTRA RELIABLE LOW LATENCY COMMUNICATIONS

RELATED APPLICATIONS

This application is related to and claims priority from U.S. Provisional Patent Application No. 62/443,464, entitled "SIGNALING, PROCEDURES, USER EQUIPMENT AND BASE STATIONS FOR UPLINK ULTRA RELIABLE LOW LATENCY COMMUNICATIONS," filed on Jan. 6, 2017, which is hereby incorporated by reference herein, in its entirety.

TECHNICAL FIELD

The present disclosure relates generally to communication systems. More specifically, the present disclosure relates to new signaling, procedures, user equipment (UE) and base stations for uplink ultra-reliable low latency communications (URLLC).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
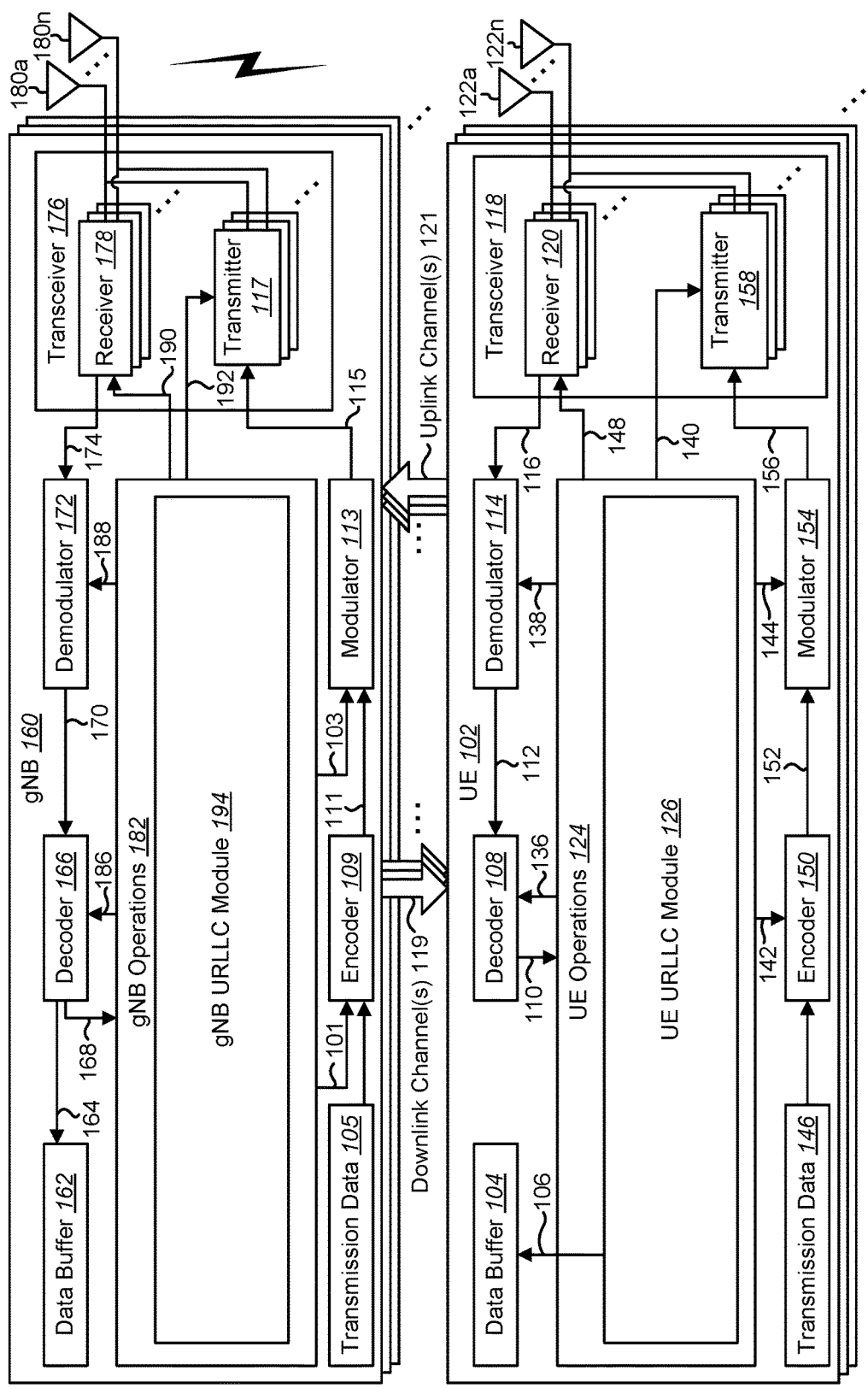
FIG. 1 is a block diagram illustrating one implementation of one or more gNBs and one or more user equipments (UEs) in which systems and methods for ultra-reliable low latency communications (URLLC) operations may be implemented.

A user equipment (UE) is described. The UE includes receiving circuitry configured to receive, from a base station apparatus, a radio resource control message including first information used for configuring a periodicity for an uplink data transmission. The receiving circuitry is configured to receive on a physical downlink control channel, from the base station apparatus, second information used for indicating an activation for the uplink data transmission. The UE also includes transmitting circuitry configured to transmit, to the base station apparatus, confirmation information Medium Access Control (MAC) Control Element (CE) for the second information. The transmitting circuitry is configured to perform on a physical uplink shared channel, to the base station apparatus, the uplink data transmission based on the first information and the second information. The receiving circuitry is also configured to receive on the physical downlink control channel, from the base station apparatus, third information used for indicating a deactivation for the uplink data transmission. The transmitting circuitry is also configured to transmit, to the base station apparatus, confirmation information MAC CE for the third information. A MAC protocol data unit subheader with the same index of logical channel identifier (LCID) is used for identifying the confirmation information MAC CE for the second information and the confirmation information MAC CE for the third information.

A base station apparatus is also described. The base station apparatus includes transmitting circuitry configured to transmit, to a user equipment, a radio resource control message including first information used for configuring a periodicity for an uplink data transmission. The transmitting circuitry is configured to transmit on a physical downlink control channel, to the user equipment, second information used for indicating an activation for the uplink data transmission. The base station apparatus also includes receiving circuitry configured to receive, from the user equipment, confirmation information MAC CE for the second information. The receiving circuitry is configured to receive on a physical uplink shared channel, from the user equipment, the uplink data transmission based on the first information and the second information. The transmitting circuitry is also configured to transmit on the physical downlink control channel, to the user equipment, third information used for indicating a deactivation for the uplink data transmission. The receiving circuitry is also configured to receive, from the user equipment, confirmation information MAC CE for the third information. A MAC protocol data unit subheader with the same index of LCID is used for identifying the confirmation information MAC CE for the second information and the confirmation information MAC CE for the third information.

A communication method of a user equipment is also described. The communication method includes receiving, from a base station apparatus, a radio resource control message including first information used for configuring a periodicity for an uplink data transmission. The communication method also includes receiving on a physical downlink control channel, from the base station apparatus, second information used for indicating an activation for the uplink data transmission. The communication method further includes transmitting, to the base station apparatus, confirmation information MAC CE for the second information. The communication method additionally includes performing on a physical uplink shared channel, to the base station apparatus, the uplink data transmission based on the first information and the second information. The communication method also includes receiving on the physical downlink control channel, from the base station apparatus, third information used for indicating a deactivation for the uplink data transmission. The communication method further includes transmitting, to the base station apparatus, confirmation information MAC CE for the third information. A MAC protocol data unit subheader with the same index of LCID is used for identifying the confirmation information MAC CE for the second information and the confirmation information MAC CE for the third information.

A communication method of a base station apparatus is also described. The communication method includes transmitting, to a user equipment, a radio resource control message including first information used for configuring a periodicity for an uplink data transmission. The communication method also includes transmitting on a physical downlink control channel, to the user equipment, second information used for indicating an activation for the uplink data transmission. The communication method further includes receiving, from the user equipment, confirmation information MAC CE for the second information. The communication method additionally includes receiving on a physical uplink shared channel, from the user equipment, the uplink data transmission based on the first information and the second information. The communication method also includes transmitting on the physical downlink control channel, to the user equipment, third information used for indicating a deactivation for the uplink data transmission. The communication method further includes receiving, from the user equipment, confirmation information MAC CE for the third information. A MAC protocol data unit subheader with the same index of LCID is used for identifying the confirmation information MAC CE for the second information and the confirmation information MAC CE for the third information.

Another UE is also described that includes receiving circuitry configured to receive a Radio Resource Control (RRC) message including first information configuring a physical uplink control channel (PUCCH) resource and second information configuring one or more physical uplink shared channel (PUSCH) resources. The UE also includes transmitting circuitry configured to transmit on the PUCCH resource, a scheduling request. Also, the receiving circuitry is configured to receive on a physical downlink channel (PDCH) resource, third information indicating a positive acknowledgment for the scheduling request, an index of the PDCH resource being determined based on an index of the PUCCH resource, and the transmitting circuitry is configured to transmit on a PUSCH resource, uplink data based on a detection of the third information, the PUSCH resource being indicated, by the third information, among the one or more PUSCH resources.

The scheduling request may be used for indicating a buffer size in an uplink, and a number of bits for the scheduling request is more than one.

Another UE is described. The UE includes receiving circuitry configured to receive a RRC message including first information configuring more than one PUSCH resources. The UE also includes transmitting circuitry configured to perform on a first PUSCH resource among the more than one PUSCH resource, an initial transmission for uplink data. The receiving circuitry is configured to receive on a PDCH resource, second information indicating a grant of a retransmission for the uplink data, the second information being used for indicating a second PUSCH resource among the more than one PUSCH resources. The transmitting circuitry is configured to perform on the second PUSCH resource, the retransmission for the uplink data based on a detection of the second information.

The second information may be used for indicating a repetition of the retransmission for the uplink data. The retransmission for the uplink data may be repeated based on the second information. The second PUSCH resource may be configured only for the retransmission for the uplink data.

A base station apparatus is also described. The base station apparatus includes transmitting circuitry configured to transmit a RRC message including first information configuring a PUCCH resource and second information configuring one or more PUSCH resources. The base station apparatus also includes receiving circuitry configured to receive on the PUCCH resource, a scheduling request. The transmitting circuitry is configured to transmit on a PDCH resource, third information indicating a positive acknowledgment for the scheduling request, an index of the PDCH resource being determined based on an index of the PUCCH resource. The receiving circuitry is configured to receive on a PUSCH resource, uplink data based on the third information, the PUSCH resource being indicated, by the third information, among the one or more PUSCH resources.

Another base station apparatus is described. The base station apparatus includes transmitting circuitry configured to transmit a RRC message including first information configuring more than one PUSCH resources. The base station apparatus also includes receiving circuitry configured to receive on a first PUSCH resource among the more than one PUSCH resource, an initial transmission for uplink data. The transmitting circuitry is configured to transmit on a PDCH resource, second information indicating a grant of a retransmission for the uplink data, the second information being used for indicating a second PUSCH resource among the more than one PUSCH resources. The receiving circuitry is configured to receive on the second PUSCH resource, the retransmission for the uplink data based on a detection of the second information.

A method of a UE is also described. The method includes receiving a RRC message including first information configuring a PUCCH resource and second information configuring one or more PUSCH resources. The method also includes transmitting on the PUCCH resource, a scheduling request. The method further includes receiving on a PDCH resource, third information indicating a positive acknowledgment for the scheduling request, an index of the PDCH resource being determined based on an index of the PUCCH resource. The method additionally includes transmitting on a PUSCH resource, uplink data based on a detection of the third information, the PUSCH resource being indicated, by the third information, among the one or more PUSCH resources.

Another method of a UE is described. The method includes receiving a RRC message including first information configuring more than one PUSCH resources. The method also includes performing on a first PUSCH resource among the more than one PUSCH resource, an initial transmission for uplink data. The method further includes receiving on a PDCH resource, second information indicating a grant of a retransmission for the uplink data, the second information being used for indicating a second PUSCH resource among the more than one PUSCH resources. The method additionally includes performing on the second PUSCH resource, the retransmission for the uplink data based on a detection of the second information.

A method of a base station apparatus is also described. The method includes transmitting a RRC message including first information configuring a PUCCH resource and second information configuring one or more PUSCH resources. The method also includes receiving on the PUCCH resource, a scheduling request. The method further includes transmitting on a PDCH resource, third information indicating a positive acknowledgment for the scheduling request, an index of the PDCH resource being determined based on an index of the PUCCH resource. The method additionally includes receiving on a PUSCH resource, uplink data based on the third information, the PUSCH resource being indicated, by the third information, among the one or more PUSCH resources.

Another method of a base station apparatus is described. The method includes transmitting a RRC message including first information configuring more than one PUSCH resources. The method also includes receiving on a first PUSCH resource among the more than one PUSCH resource, an initial transmission for uplink data. The method further includes transmitting on a PDCH resource, second information indicating a grant of a retransmission for the uplink data, the second information being used for indicating a second PUSCH resource among the more than one PUSCH resources. The method additionally includes receiving on the second PUSCH resource, the retransmission for the uplink data based on a detection of the second information.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. A new radio base station may be referred to as a gNB. A gNB may also be more generally referred to as a base station device.

Currently latency issues are addressed in LTE largely via scheduling and prioritization of transmissions. There are no real flexible uses of the medium outside of scheduling for Machine-Type Communications (MTC) and delay tolerant services, although the Narrowband Internet of Things ("NBIoT") extensions to LTE employ a specific set of time/frequency resources. Moreover, there is little standardized information passed between different eNBs today that would enable such services to efficiently coexist. The systems and methods described herein teach various means for the eMBB, mMTC, and URLLC services to efficiently use the medium beyond what has been previously disclosed.

Specifically, the systems and methods described herein teach approaches for URLLC uplink (UL) transmission management to meet latency/reliability requirements and to address potential coexistence issues. The key requirements for URLLC relate to user (U)-plane latency and reliability. For URLLC, the target U-plane latency is 0.5 ms each way for both UL and DL. The target reliability is 1-10-5 for X bytes within 1 ms.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for ultra-reliable low latency communications (URLLC) operations may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), Medium Access Control (MAC) Protocol Data Unit (PDU), and/or UL-SCH (Uplink-Shared Channel)).

Here, UL data may include URLLC data. The URLLC data may be UL-SCH data. Here, URLLC-PUSCH (i.e., different Physical Uplink Shared Channel from PUSCH) may be defined for transmitting the URLLC data. The URLLC-PUSCH described herein is assumed to be included in the PUSCH for the sake of simple description.

Also, for example, uplink channels 121 may be used for transmitting Hybrid Automatic Repeat Request-acknowledgment (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Here, more than one DCI formats may be defined for DCI transmission. For example, DCI format that may be used for scheduling of PUSCH is defined. For example, DCI format to which CRC (Cyclic Redundancy Check) parity bits scrambled by SPS C-RNTI (Cell-Radio Network Temporary Identifier) are attached may be used for activating and/or deactivating UL data transmission (e.g., activating and/or deactivating (releasing) PUSCH resource for UL data transmission). Also, for example, DCI format to which CRC (Cyclic Redundancy Check) parity bits scrambled by URLLC C-RNTI (i.e., different RNTI from SPS C-RNTI) are attached may be used for activating and/or deactivating UL data transmission (e.g., activating and/or deactivating (releasing) PUSCH resource for URLLC data transmission).

Here, URLLC-PDCCH (i.e., different Physical Downlink Control Channel from PDCCH) may be defined for transmitting DCI format that may be used for activating and/or deactivating UL data transmission (e.g., activating and/or deactivating (releasing) PUSCH resource for URLLC data transmission). Also, URLLC-DCI format (i.e., different DCI format from DCI format) that is used for activating and/or deactivating UL data transmission (e.g., activating and/or deactivating (releasing) PUSCH resource for URLLC data transmission) may be defined. Here, the URLLC-PDCCH described herein is assumed to be included in the PDCCH for the sake of simple description. Also, the URLLC-DCI format described herein is assumed to be included in the DCI format for the sake of simple description.

Here, the UE 102 may monitor (attempt to decode) PDCCH in a common search space and/or a UE-specific search space. Here, the UE-specific search space may be determined based on C-RNTI, SPS C-RNTI, and/or URLLC C-RNTI. Also, the UE receives the RRC signal including information that is used for determining the UE-specific search space.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122$a$-$n$. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122$a$-$n$. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE URLLC module 126.

The UE URLLC module 126 may perform URLLC operations. URLLC operations may include grant-free data transmission (UL transmission without detection of downlink control information for triggering), sub-slot base data transmission, SR triggered data transmission (SR is sent before data transmission), SR-less data transmission (SR is not used), etc.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid in the downlink is discussed in connection with FIG. 2.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC. An example of a resource grid in the uplink is discussed in connection with FIG. 3.

The UE URLLC module 126 may perform URLLC uplink (UL) transmission management to meet latency/reliability requirements and to address potential coexistence issues. The key requirements for URLLC relate to U-plane latency and reliability. For URLLC, the target U-plane latency is 0.5 ms each way for both UL and DL. The target reliability is $1-10^{-5}$ for X bytes within 1 ms.

Some approaches for meeting URLLC requirements may include the following: semi-static resource allocation for UL data transmission; dynamic indication of available resource (e.g., by broadcast DCI) for UL data transmission; normal SR-based transmission; and other solutions are not precluded.

For semi-static resource allocation (also referred to as semi-persistent scheduling (SPS)), there are several basic procedures: radio resource control (RRC) configuration (i.e., a RRC message, a RRC signal), activation, UL transmission and deactivation. The RRC configuration may be exchanged between the gNB 160 and the UE 102 through a RRC layer. And, the RRC signal may be included in a higher layer signal. At the beginning, the gNB 160 should allocate SPS resource (e.g., a Physical Resource Block (PRB) index of SPS resource) and function to a specific UE 102 by SPS-Config, which is shown in the SPS-Config information element of Listing 1.

Here, the SPS resource may include (correspond to) UL resource, a frequency resource, UL-SCH resource, and/or PUSCH resource. Also, the gNB 160 may allocate SPS resource, which is shown in the URLLC-Config information element of Listing 2. Here, for example, the gNB 160 may configure a periodicity (e.g., a time resource) by using the RRC signal, and indicate SPS resource (e.g., a frequency resource) by using DCI format.

Also, the gNB 160 may transmit multiple configuration (e.g., multiple periodicities and multiple SPS resources) by using the RRC signal and indicate one configuration (e.g., one periodicity and one SPS resource) by using DCI format. Also, the gNB 160 may transmit multiple periodicities by using the RRC signal and indicate one periodicity and one SPS resource by using DCI format. In these cases, the DCI format may be the DCI format used for activating and/or deactivating UL transmission as mentioned above.

Also, the gNB 160 may allocate Dynamic Scheduling (DS) resource (also referred to as DS resource). Here, the DS resource may include (correspond to) UL resource, a frequency resource, UL-SCH resource, and/or PUSCH resource. For example, DS resource may be scheduled by using DCI format to which CRC parity bits scrambled by C-RNTI.

Also, the DS resource may be used for transmitting eMBB data. Namely, there may be the first UL transmission on the first SPS resource, the second UL transmission on the second SPS resource, and the third UL transmission on the DS resource. Here, the first SPS resource and the second SPS resource may be allocated different method as above mentioned (e.g., different RNTI may be used for allocation, different PDCCH may be used for allocation, different DCI format may be used for allocation, and/or different periodicity may be used for allocation; etc.).

Here, in a case of collision of the first UL transmission and the second UL transmission in a same timing (e.g., in a same subframe, in a same slot, in a same mini-slot, and/or in a same symbol), only the second UL transmission may be performed, and the first UL transmission may be dropped. Namely, the second SPS resource may be used for UL transmission.

Also, in a case of collision of the first UL transmission and the third UL transmission in a same timing, only the third UL transmission may be performed, and the first UL transmission may be dropped. Namely, the DS resource may be used for UL transmission.

Also, in a case of collision of the second UL transmission and the third UL transmission in a same timing, only the second UL transmission may be performed, and the third transmission may be dropped. Namely, the second SPS resource may be used for UL transmission. Here, in a case of collision of the second UL transmission and the third UL transmission in a same timing, only the third UL transmission may be performed, and the second UL transmission may be dropped. Namely, the DS resource may be used for UL transmission.

Also, in a case of collision of the second UL transmission and the third UL transmission in a same timing, the second and the third transmissions are performed. Namely, the second SPS resource and/or the DS resource may be used for UL transmission. Here, in these cases, a Single-Carrier Frequency Division Multiple Access (SC-FDMA) access scheme may be applied.

Listing 1

```
-- ASN1START
SPS-Config ::= SEQUENCE {
    semiPersistSchedC-RNTI           C-RNTI              OPTIONAL,
    sps-ConfigDL                     SPS-ConfigDL        OPTIONAL,        --
Need ON
    sps-ConfigUL                     SPS-ConfigUL        OPTIONAL         --
Need ON
}
SPS-ConfigDL ::= CHOICE{
    release                          NULL,
    setup                            SEQUENCE {
        semiPersistSchedIntervalDL            ENUMERATED {
                                              sf10, sf20, sf32, sf40, sf64, sf80,
                                              sf128, sf160, sf320, sf640, spare6,
                                              spare5, spare4, spare3, spare2,
                                              spare1},
        numberOfConfSPS-Processes             INTEGER (1..8),
        n1PUCCH-AN-PersistentList             N1PUCCH-AN-PersistentList,
        ...,
        [[ twoAntennaPortActivated-r10        CHOICE {
            release                           NULL,
            setup                             SEQUENCE {
                n1PUCCH-AN-PersistentListP1-r10              N1PUCCH-AN-
PersistentList
            }
        }
    OPTIONAL -- Need ON
    ]]
    }
}
SPS-ConfigUL ::= CHOICE {
    release                          NULL,
    setup                            SEQUENCE {
        semiPersistSchedIntervalUL            ENUMERATED {-- Period of UL SPS
                                              sf10, sf20, sf32, sf40, sf64, sf80,
                                              sf128, sf160, sf320, sf640, sf1-v14xy,
                                              sf2-v14xy, sf3-v14xy, sf4-v14xy,
                                              sf5-v14xy, spare1},
        implicitReleaseAfter                  ENUMERATED {e2, e3, e4, e8},
        p0-Persistent                         SEQUENCE {
            p0-NominalPUSCH-Persistent            INTEGER (-126..24),
            p0-UE-PUSCH-Persistent                INTEGER (-8..7)
        } OPTIONAL,                                               -- Need OP
        twoIntervalsConfig                    ENUMERATED {true}
OPTIONAL, -- Cond TDD
        ...,
        [[ p0-PersistentSubframeSet2-r12      CHOICE {
```

Listing 1

```
        release                         NULL,
        setup                           SEQUENCE {
            p0-NominalPUSCH-PersistentSubframeSet2-r12
    INTEGER (-126..24),
            p0-UE-PUSCH-PersistentSubframeSet2-r12
    INTEGER (-8..7)
            }
        }                                                   OPTIONAL    -
    ]],
    [[ numberOfConfUlSPS-Processes-r13      INTEGER (1..8)
    OPTIONAL -- Need OR
    ]]
    }
}
N1PUCCH-AN-PersistentList ::=   SEQUENCE (SIZE (1..4)) OF INTEGER
(0..2047)
-- ASN1STOP
```

Listing 2

```
-- ASN1START
URLLC-Config ::= SEQUENCE {
    URLLCSchedC-RNTI                C-RNTI (or URLLC-RNTI)
    OPTIONAL,                       -- Need OR
    URLLC-ConfigUL                  URLLC-ConfigUL      OPTIONAL
}
URLLC-ConfigUL ::= CHOICE {
    release                         NULL,
    setup                           SEQUENCE {
        URLLCInterval               ENUMERATED {-- Period of UL SPS
                                        sf10, sf20, sf32, sf40, sf64, sf80,
                                        sf128, sf160, sf320, sf640},
        implicitReleaseAfter (or URLLC-Timer)   ENUMERATED {e2, e3, e4, e8},
        p0-URLLC                    SEQUENCE {
            p0-NominalPUSCH-URLLC       INTEGER (-126..24),
            p0-UE-PUSCH-URLLC           INTEGER (-8..7)
        } OPTIONAL,                                         -- Need OP
N1PUCCH-AN-PersistentList ::=   SEQUENCE (SIZE (1..4)) OF INTEGER
(0..2047)
-- ASN1STOP
```

After UL SPS is configured and activated, the UE 102 knows it has been allocated SPS UL resources in the subframes that satisfy the following equations:

(10*SFN+subframe)=[(10*SFNstart_time+subframe-start_time)+$N$*semiPersistSchedIntervalUL+Subframe_Offset*($N$ modulo 2)]modulo 10240, where SFNstart_time and subframestart_time are the System Frame number (SFN) and subframe, respectively, at the time the configured uplink grant was (re-)initialized. The details can be checked in TS 36.321 Section 5.10.1. Then, the UE 102 may start UL transmission. In Release 8, the UE 102 keeps transmitting at the allocated resources until UL SPS is deactivated explicitly and implicitly. In Release 14, the UE 102 transmits as needed and skips the allocated resources when there is no transport block (TB) for transmission.

To better utilize SPS for URLLC UL, there are two remaining problems. The first one is how to determine the period. URLLC may use a shorter scheduling interval. Thus, the granularity of the periodicity for UL data transmission (i.e., URLLCInterval) may be configured as subframe level, slot level, mini-slot level, and/or symbol level. And the granularity of the periodicity may depend on the new radio (NR) frame structure. Regardless, the period is supposed to be less than 0.5 ms. Due to the sporadic nature of URLLC service, the UE 102 can waste most of the allocated resources.

The second problem is when to activate or deactivate UL SPS. Since URLLC services are unpredictable in most cases, it is hard to avoid a waste of resource due to the latency/reliability requirement. For example, UL SPS should be activated as early as possible before the URLLC traffic comes. As a result, SPS can be used for URLLC UL but it may waste resources.

As mentioned above, the gNB 160 may, using the PDCCH (i.e., DCI format), activate and/or deactivate (release) the first UL transmission on the first SPS resource. Here, the UE 102 may transmit HARQ-ACK (also referred to as confirmation information) based on a detection of the PDCCH indicating activation and/or deactivation (release) of the first UL transmission. For example, the HARQ-ACK for the PDCCH indicating activation and/or deactivation of the first UL transmission may be transmitted on PUCCH and/or using MAC control element (CE).

Also, the gNB 160 may, using the PDCCH (i.e., DCI format), activate and/or deactivate (release) the second UL transmission on the second SPS resource. The UE 102 may transmit HARQ-ACK (also referred to as confirmation information) based on a detection of the PDCCH indicating activation and/or deactivation (release) of the second UL transmission. For example, HARQ-ACK for the second UL transmission may be transmitted on PUCCH and/or using MAC CE. Here, in these cases, in a case that the HARQ- ACK is transmitted using MAC CE, HARQ-ACK MAC CE may be defined. And, the HARQ-ACK MAC CE may be identified by a MAC PDU subheader with LCID (Logical Channel ID).

Here, the same LCID (i.e., a single common LCID) may be used for a single common HARQ-ACK MAC CE for PDCCH indicating activation and/or deactivation of the first UL transmission and PDCCH indicating activation and/or deactivation of the second UL transmission. For example, the index "10101" may be used as the value of LCID for the HARQ-ACK MAC CE for PDCCH indicating activation and/or deactivation of the first UL transmission and PDCCH indicating activation and/or deactivation of the second UL transmission.

Here, different LCID may be used for the HARQ-ACK MAC CE for PDCCH indicating activation and/or deactivation of the first UL transmission (i.e., a first HARQ-ACK MAC CE) and the HARQ-ACK MAC CE for PDCCH indicating activation and/or deactivation of the second UL transmission (i.e., a second HARQ-ACK MAC CE). For example, an index "10101" may be used as a value of LCID for the first HARQ-ACK MAC CE. And, an index "10011" may be used as a value of LCID for the second HARQ-ACK MAC CE.

Also, in a case that different value(s) of LCID(s) is used for the first HARQ-ACK MAC CE and the second HARQ-ACK MAC CE, the Logical Channel Prioritization procedure may be applied. Namely, a prioritization of logical channel (e.g., MAC CE) may be applied for the first HARQ-ACK MAC CE and the second HARQ-ACK MAC CE. For example, the UE 102 may control a scheduling of uplink data (i.e., UL transmission) by signaling of each logical channel. Namely, the UE 102 may allocate resources, according to a priority order (i.e., the Logical Channel Prioritization procedure), for all UL data that is available for transmission on the logical channel, and may not transmit UL data that is not available for transmission on the logical channel. For example, the Logical Channel Prioritization procedure may be applied when a new transmission is performed. For example, for the Logical Channel Prioritization procedure, the UE 102 may prioritize the second HARQ-ACK MAC CE over the first HARQ-ACK MAC CE. Also, for the Logical Channel Prioritization procedure, the UE 102 may prioritize the first HARQ-ACK MAC CE over the second HARQ-ACK MAC CE.

For scheduling request (SR), first of all, each UE 102 has its own SR resource(s) (e.g., PUCCH format 1, PUCCH format 3, UL control channel long format, and/or UL control channel short format), which is allocated by an eNB. SR resource is periodic, which is configured by SchedulingRequestConfig. An example of the SchedulingRequestConfig resource element is provided in Listing 3.

| Listing 3 |
|---|
| -- ASN1START |
| SchedulingRequestConfig ::=         CHOICE { |
|    release                                                  NULL, |
|    setup                                                    SEQUENCE { |
|      sr-PUCCH-ResourceIndex            INTEGER (0..2047),    --PUCCH1 resource |
|      sr-ConfigIndex                             INTEGER (0..157),      --period and offset |
|      dsr-TransMax                              ENUMERATED { |
|         n4, n8, n16, n32, n64, spare3, spare2, spare1} |
|    } |
| } |
| SchedulingRequestConfig-v1020 ::=    SEQUENCE { |
|    sr-PUCCH-ResourceIndexP1-r10      INTEGER (0..2047) |
|    OPTIONAL       -- Need OR |
| } |
| SchedulingRequestConfigSCell-r13 ::=  CHOICE { |
|    release                                                  NULL, |
|    setup                                                    SEQUENCE { |
|      sr-PUCCH-ResourceIndex-r13        INTEGER (0..2047), |
|      sr-PUCCH-ResourceIndexP1-r13    INTEGER (0..2047) |
|    OPTIONAL,       -- Need OR |
|      sr-ConfigIndex-r13                        INTEGER (0..157), |
|      dsr-TransMax-r13                         ENUMERATED { |
|         n4, n8, n16, n32, n64, spare3, spare2, |
| spare1} |
|    } |
| } |
| -- ASN1STOP |

In Listing 3, sr-ConfigIndex indicates the SR transmission period and offset, which is shown in Table (1) (from Table 10.1.5-1 of TS 36.213). SR transmission instances are the uplink subframes satisfying $(10 \times n_f + \lfloor n_s/2 \rfloor - N_{OFFSET,SR}) \mod SR_{PERIODICITY} = 0$

TABLE 1

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR}$-5 |
| 15-34 | 20 | $I_{SR}$-15 |
| 35-74 | 40 | $I_{SR}$-35 |
| 75-154 | 80 | $I_{SR}$-75 |
| 155-156 | 2 | $I_{SR}$-155 |
| 157 | 1 | $I_{SR}$-157 |

When UL data arrives, the UE 102 will send SR at the next available SR resource. Then the UE 102 waits for the UL grant (e.g., DCI format 0 or 4), including resource block assignment, modulation and coding scheme (MCS). Finally, the UE 102 can transmit UL data at the allocated resource indicated by the UL grant.

To meet the latency requirement, SR periodicity should be shortened. Thus, the granularity of the periodicity for SR resource (i.e., SR transmission) may be configured as subframe level, slot level, mini-slot level, and/or symbol level. For example, the eNB/gNB 160 may configure SR resource of PUCCH format 1. Also, the eNB/gNB 160 may configure and/or indicate SR resource of UL control channel long format (the first PUCCH format). Namely, SR resource of UL control channel long format may be configured by the RRC signal and/or indicated by using PDCCH (e.g., DCI format that is used for scheduling of PDSCH). Also, SR resource of UL control channel short format (the second PUCCH format) may be configured by the RRC signal and/or indicated by DCI (e.g., DCI format that is used for scheduling of PDSCH). Here, for example each periodicity of the SR resource of different PUCCH format(s) may be configured as subframe level, slot level, mini-slot level, and/or symbol level. However, the timing between SR from the UE 102 and UL grant from an eNB, as well as the timing between UL grant and UL data transmission cannot guarantee the low latency. Thus, SR for URLLC UL may be possible but the latency requirement is difficult to satisfy. Therefore, there is a need for a more efficient method to meet the latency/reliability requirements of URLLC without wasting resources.

The described systems and methods teach procedures and signaling for efficient uplink transmission. Based on the information carried by (new) SR, multi-bits new signaling and pre-configuration, there can be many cases. Two approaches for procedures and signaling for efficient uplink transmission as described herein.

A first approach may be used for resource configuration of a scheduling request (SR), an initial transmission, additional transmission and/or retransmission. A second approach may be used for resource configuration of an initial transmission, additional transmission and/or retransmission. Examples of these first and second approaches are described in connection with FIG. 11.

These procedures introduce a multi-bits new signaling. This new signaling may be triggered by SR, an initial transmission or a retransmission. This new signaling may trigger an initial transmission and the retransmission. This new signaling may also acknowledge a successful transmission.

This new signaling may indicate one or more of the following. The purpose of this new signaling may be indicated. This may include a grant of a new transmission, a grant of the retransmission, an acknowledgement of a successful transmission, a combination of any two above. A UE 102 may not need the explicit indication for the purpose of this new signaling This new signaling may indicate resource allocation (e.g., primary resource). This resource allocation indication may include resource indices. This may include an index offset from the pre-configured resources, a bitmap among prescribed resources, and an absolute value of the resource index. The UE 102 may derive the resource location from the timing of the received new signaling.

This resource allocation indication may indicate what are primary resources. For example, this may include all resources, pre-configured resources for initial transmissions-first (which can be used by one or multiple UEs 102), pre-configured resources for retransmissions-first (which can be used by one or multiple UEs 102), or pre-configured resources shared by initial transmissions and retransmissions.

The resource allocation indication may indicate resource allocation (e.g., additional resources). This indication may include resource indices. The resource indices may include an index offset from the pre-configured resources, a bitmap among prescribed resources and/or an absolute value of the resource index. The UE 102 may derive the resource location from the timing of the received new signaling The resource allocation indication may indicate the number of additional resources. Additional resources may be deterministic from the number of additional resources.

The resource allocation indication may indicate what are the potential additional resources. This may include all resources, a resource pool for initial transmissions, and/or a resource pool for retransmissions. The additional resource may be time division multiplexed with the pre-configured primary resource or the additional resource may be frequency division multiplexed with the pre-configured primary resource.

The resource allocation indication may also provide an antenna port indication, precoding indication, MCS indication, redundancy version indication and frequency hopping indication.

The procedure for approach 1 may use a multi-bits new SR signaling. This new SR may indicate one or more of the following: priority level of the transmission, buffer status, MCS, the number of required resources, numerology (Sub Carrier Spacing (SCS), e.g., 15 kHz, 30 kHz and/or 60 kHz), services or requirements (e.g., eMBB or URLLC). The number of bits may be changed by eNB/gNB 160 by RRC, DCI or a MAC control element (CE). The MAC CE may be exchanged between the eNB/gNB 160 and the UE 102 through a MAC layer. And, the MAC CE may be included in the higher layer signal. The number of bits may be determined by the number of choices provided for UE 102.

The procedures may need pre-configuration before sending SR or initial transmission. The configuration may indicate one or more of the following: SR resources, initial transmission resources, retransmission resources, additional resources, MCS, numerology (SCS, e.g. 15 kHz, 30 kHz and/or 60 kHz), antenna port indication, and precoding indication.

This pre-configuration before sending SR or initial transmission may be configured by RRC, MAC CE, DCI (where the DCI may be same as or different from the multi-bits new signaling above), or any combination of the methods above.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB URLLC module 194. The gNB URLLC module 194 may perform URLLC operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
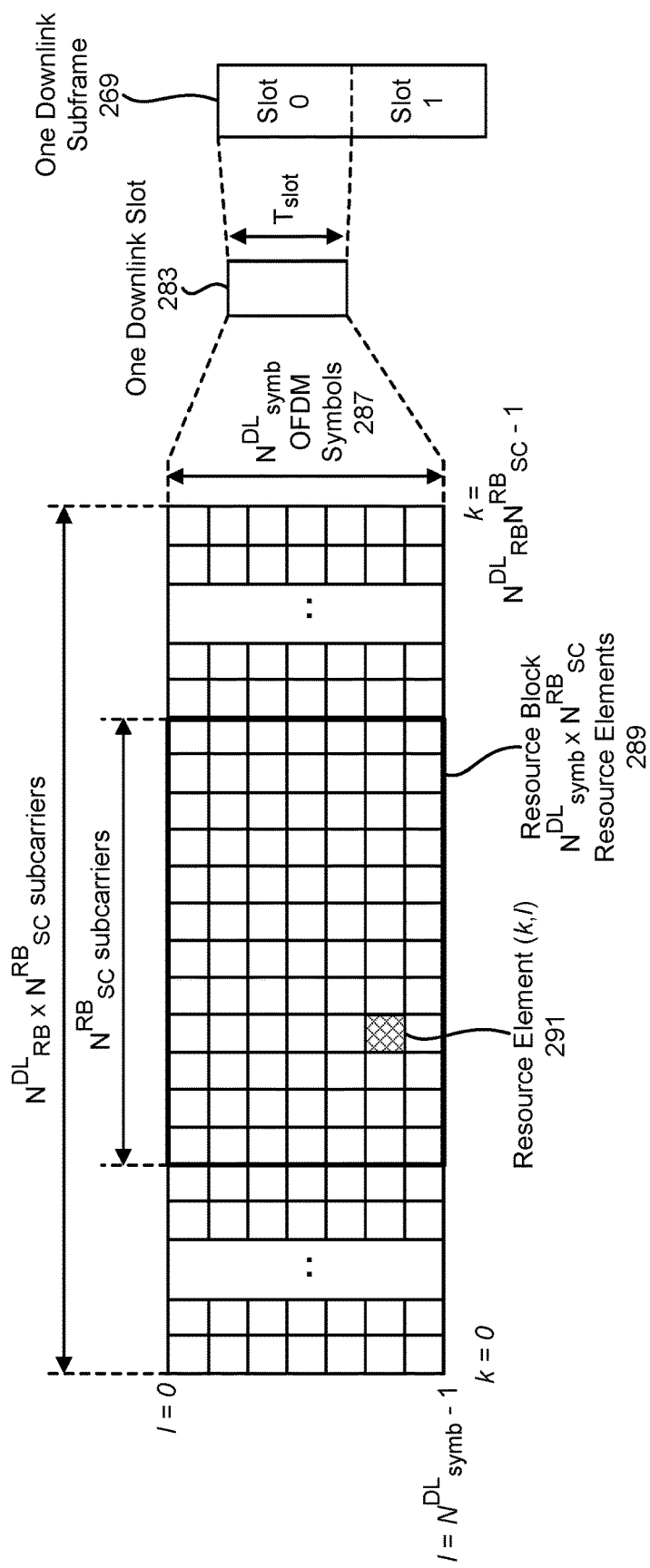
FIG. 2 is a diagram illustrating one example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including a Licensed Assisted Access (LAA) SCell), $N^{DL}_{RB}$ is configured by a RRC message dedicated to a UE 102. For PDSCH mapping, the available RE 291 may be the RE 291 whose index l fulfils $1 \geq 1_{data,start}$ and/or $1_{data,end} \geq 1$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may consist of multiple pairs of downlink resource blocks (RBs) which is also referred to as physical resource blocks (PRBs). The downlink resource block (RB) pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
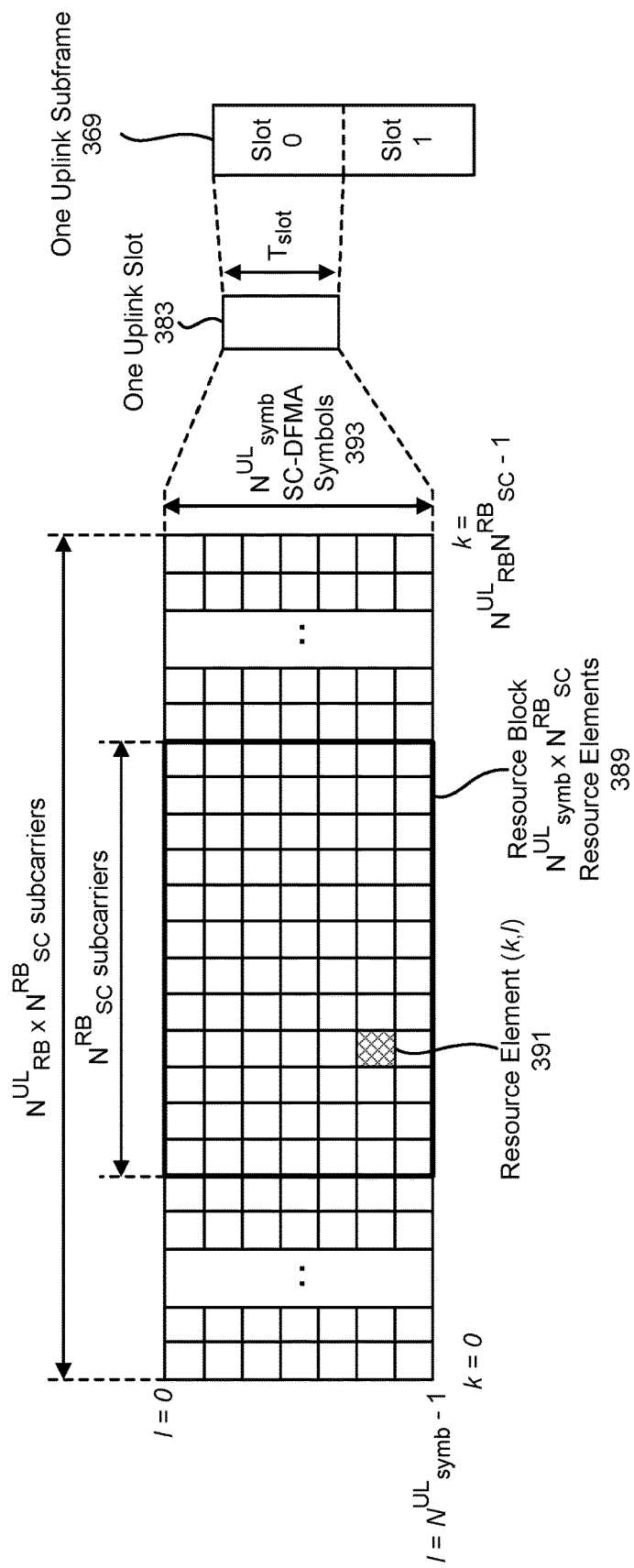
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-Orthogonal Frequency Division Multiplexed (OFDM), a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
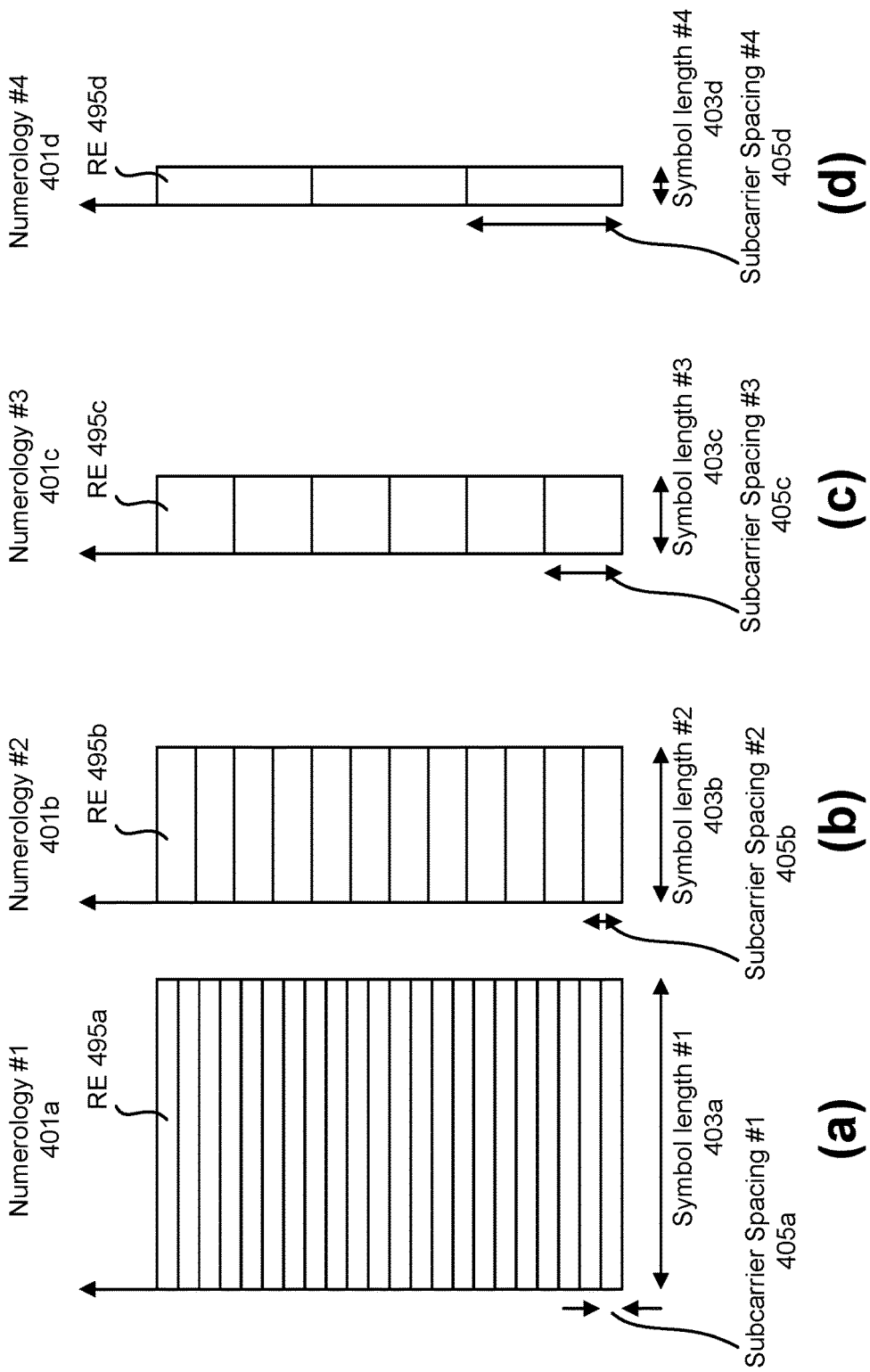
FIG. 4 shows examples of several numerologies.

FIG. 4 shows examples of several numerologies 401. The numerology #1 401*a* may be a basic numerology (e.g., a reference numerology). For example, a RE 495*a* of the basic numerology 401*a* may be defined with subcarrier spacing 405*a* of 15 kHz in frequency domain and 2048 Ts+CP length (e.g., 160 Ts or 144 Ts) in time domain (i.e., symbol length #1 403*a*), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 401*a* (e.g., a subcarrier spacing of 15 kHz). Here, the UE 102 may acquire (detect) the numerology #1 401*a* based on a synchronization signal. Also, the UE 102 may receive a dedicated RRC signal including information (e.g., a handover command) configuring the numerology #1 401*a*. The dedicated RRC signal may be a UE-specific signal. Here, the first UL transmission on the first SPS resource may be performed on the numerology #1 401*a*, the numerology #2 401*b* (a subcarrier spacing of 30 kHz), and/or the numerology #3 401*c* (a subcarrier spacing of 60 kHz).

Also, the second UL transmission on the second SPS resource as above mentioned may be performed only on the numerology #3 401*c*. Here, for example, the UE 102 may receive System Information (e.g., Master Information Block (MIB) and/or System Information Block (SIB)) including information configuring the numerology #2 401*b* and/or the numerology #3 401*c*.

Also, the UE 102 may receive the dedicated RRC signal including information (e.g., the handover command) configuring the numerology #2 401*b* and/or the numerology #3 401*c*. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology 401*a*, the second numerology 401*b*, and/or the third numerology 401*c*) for each of UL transmissions (e.g., each of UL-SCH transmissions, each of PUSCH transmissions). Also, the dedicated RRC signal may include each of multiple numerology configurations (the first numerology 401*a*, the second numerology 401*b*, and/or the third numerology 401*c*) for each of DL transmissions (each of PDCCH transmissions).

Figure 5:
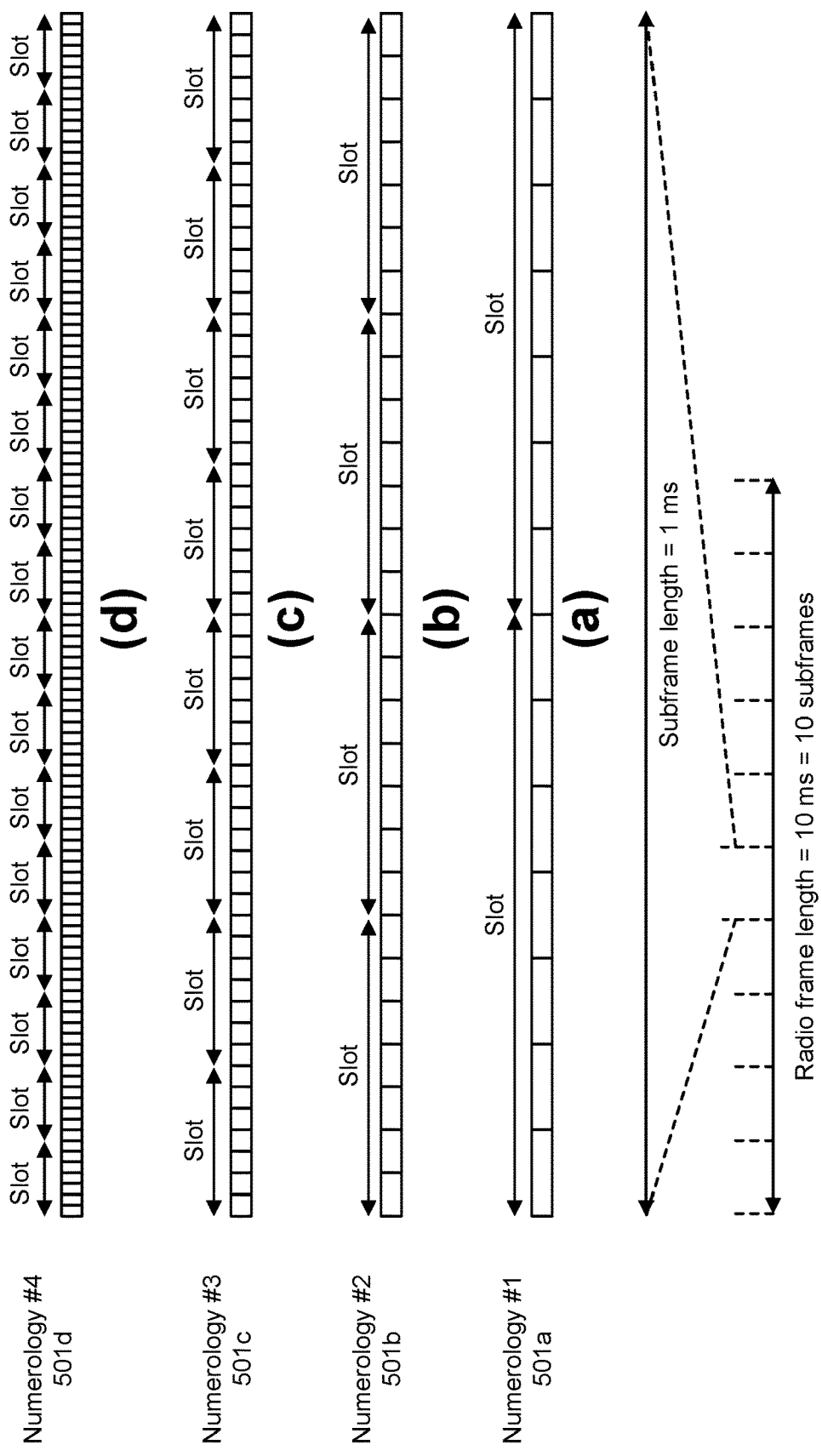
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
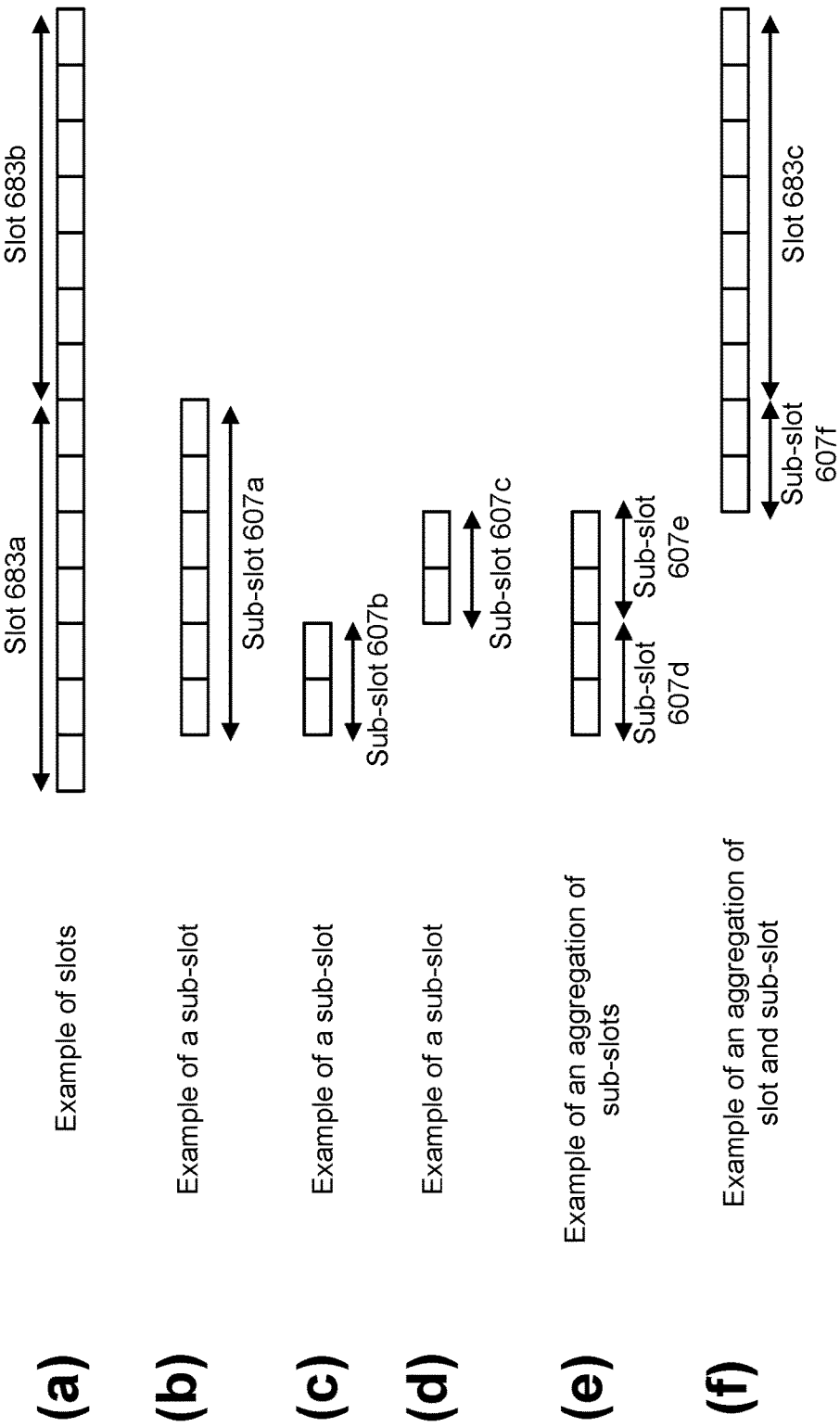
FIG. 6 shows examples of slots and sub-slots.

FIG. 6 shows examples of slots 683 and sub-slots 607. If a sub-slot 607 is not configured by higher layer, the UE 102 and the eNB/gNB 160 may only use a slot 683 as a scheduling unit. More specifically, a given transport block may be allocated to a slot 683. If the sub-slot 607 is configured by higher layer, the UE 102 and the eNB/gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
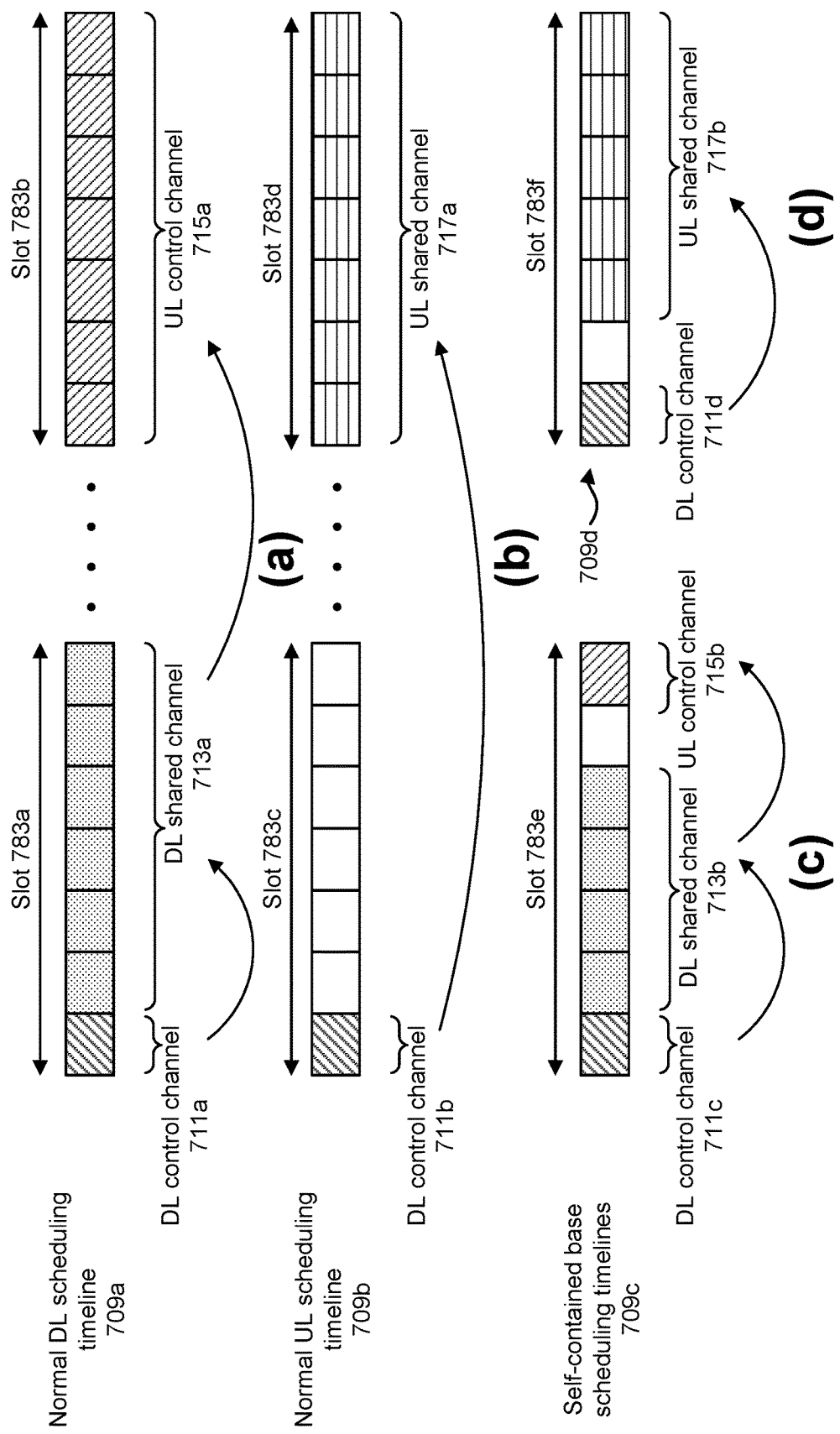
FIG. 7 shows examples of scheduling timelines.

FIG. 7 shows examples of scheduling timelines 709. For a normal DL scheduling timeline 709*a*, DL control channels are mapped the initial part of a slot 783*a*. The DL control channels 711 schedule DL shared channels 713*a* in the same slot 783*a*. HARQ-ACKs for the DL shared channels 713*a* (i.e., HARQ-ACKs each of which indicates whether or not transport block in each DL shared channel 713*a* is detected successfully) are reported via UL control channels 715*a* in a later slot 783*b*. In this instance, a given slot 783 may contain either one of DL transmission and UL transmission.

For a normal UL scheduling timeline 709*b*, DL control channels 711*b* are mapped the initial part of a slot 783*c*. The DL control channels 711*b* schedule UL shared channels 717*a* in a later slot 783*d*. For these cases, the association timing (time shift) between the DL slot 783*c* and the UL slot 783*d* may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709*c*, DL control channels 711*c* are mapped to the initial part of a slot 783*e*. The DL control channels 711*c* schedule DL shared channels 713*b* in the same slot 783*e*. HARQ-ACKs for the DL shared channels 713*b* are reported in UL control channels 715*b*, which are mapped at the ending part of the slot 783*e*.

For a self-contained base UL scheduling timeline 709*d*, DL control channels 711*d* are mapped to the initial part of a slot 783*f*. The DL control channels 711*d* schedule UL shared channels 717*b* in the same slot 783*f*. For these cases, the slot 783*f* may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
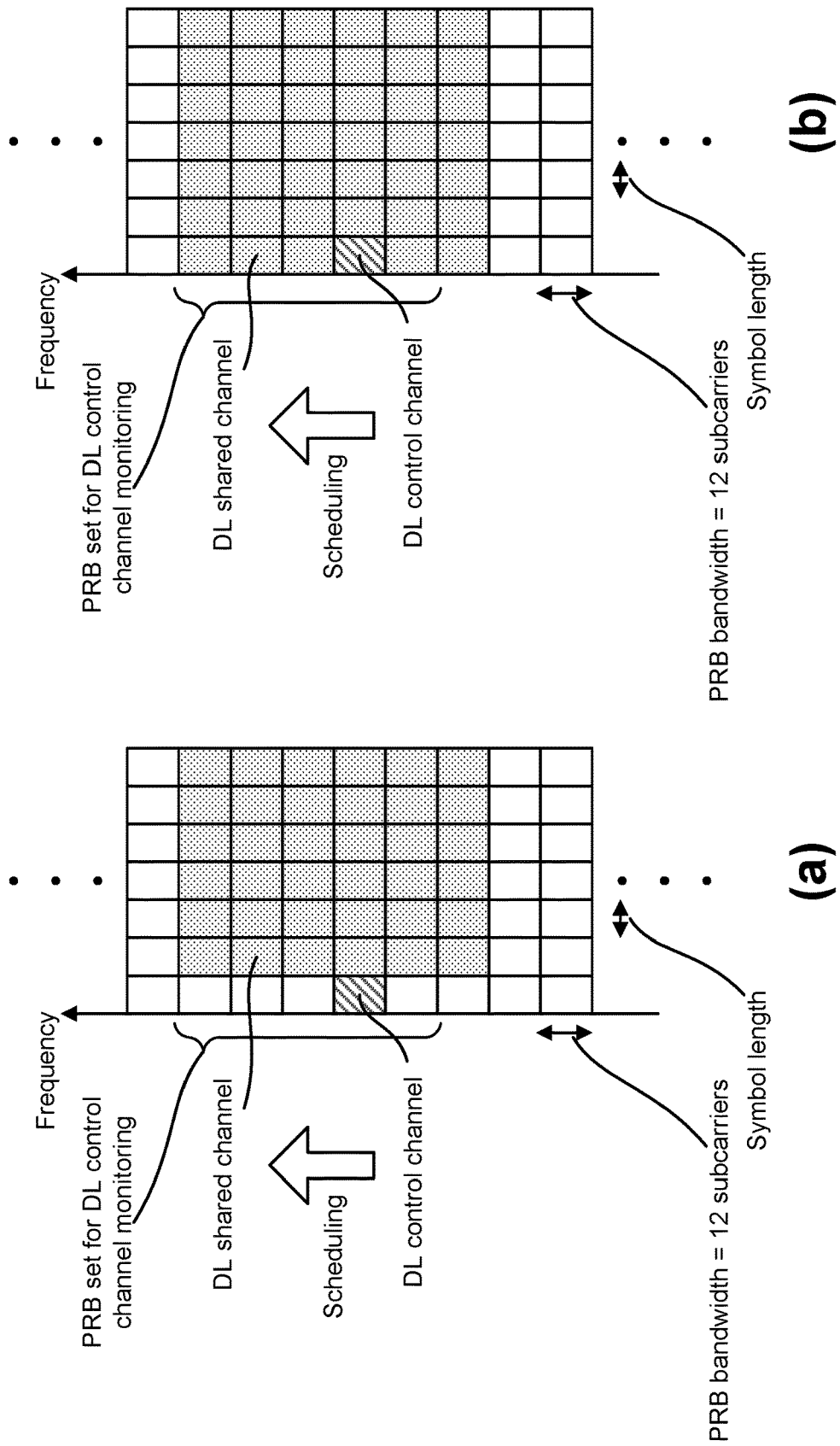
FIG. 8 shows examples of downlink (DL) control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include a demodulation reference signal (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
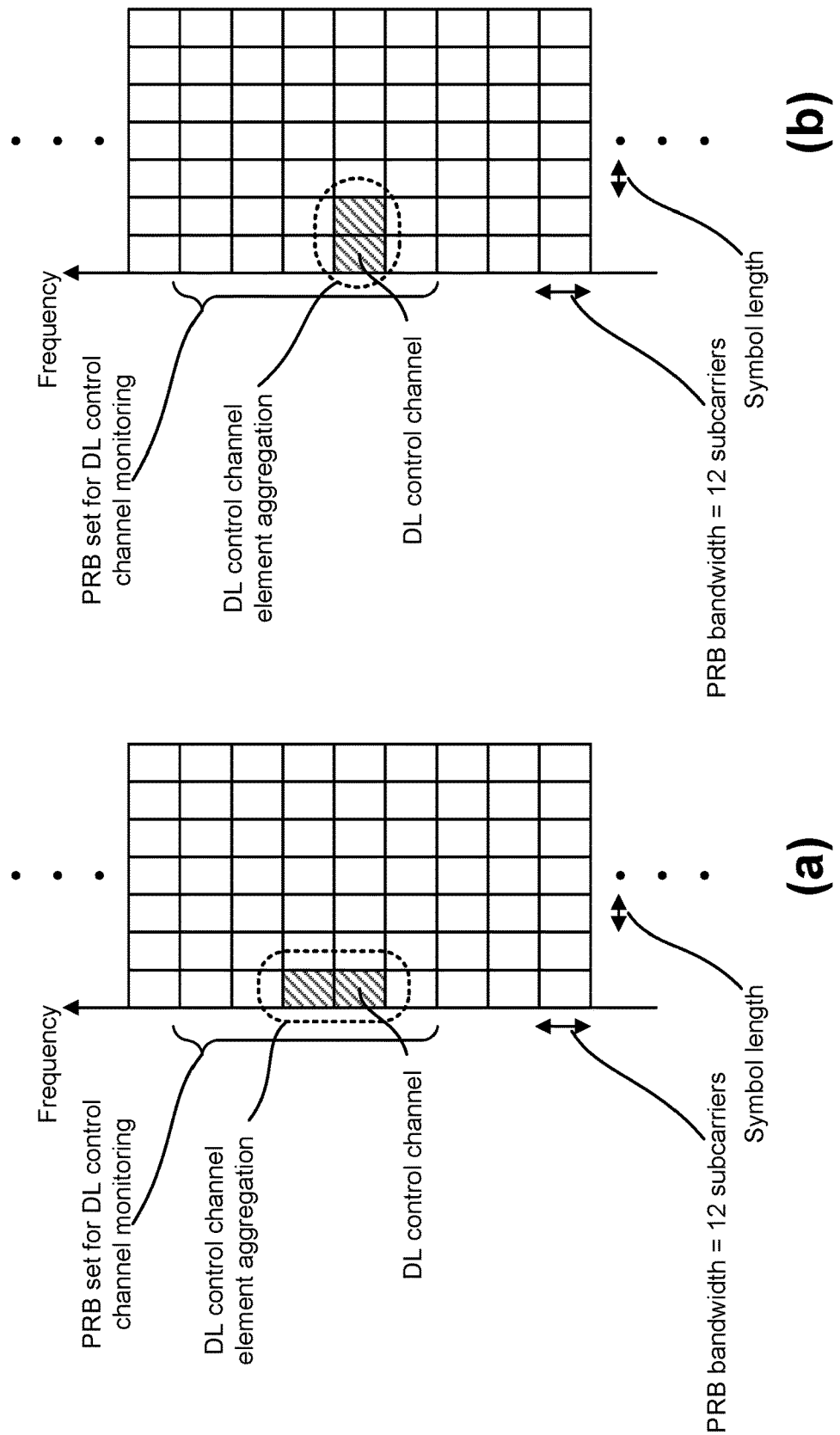
FIG. 9 shows examples of DL control channel which consists of more than one control channel elements.

FIG. 9 shows examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
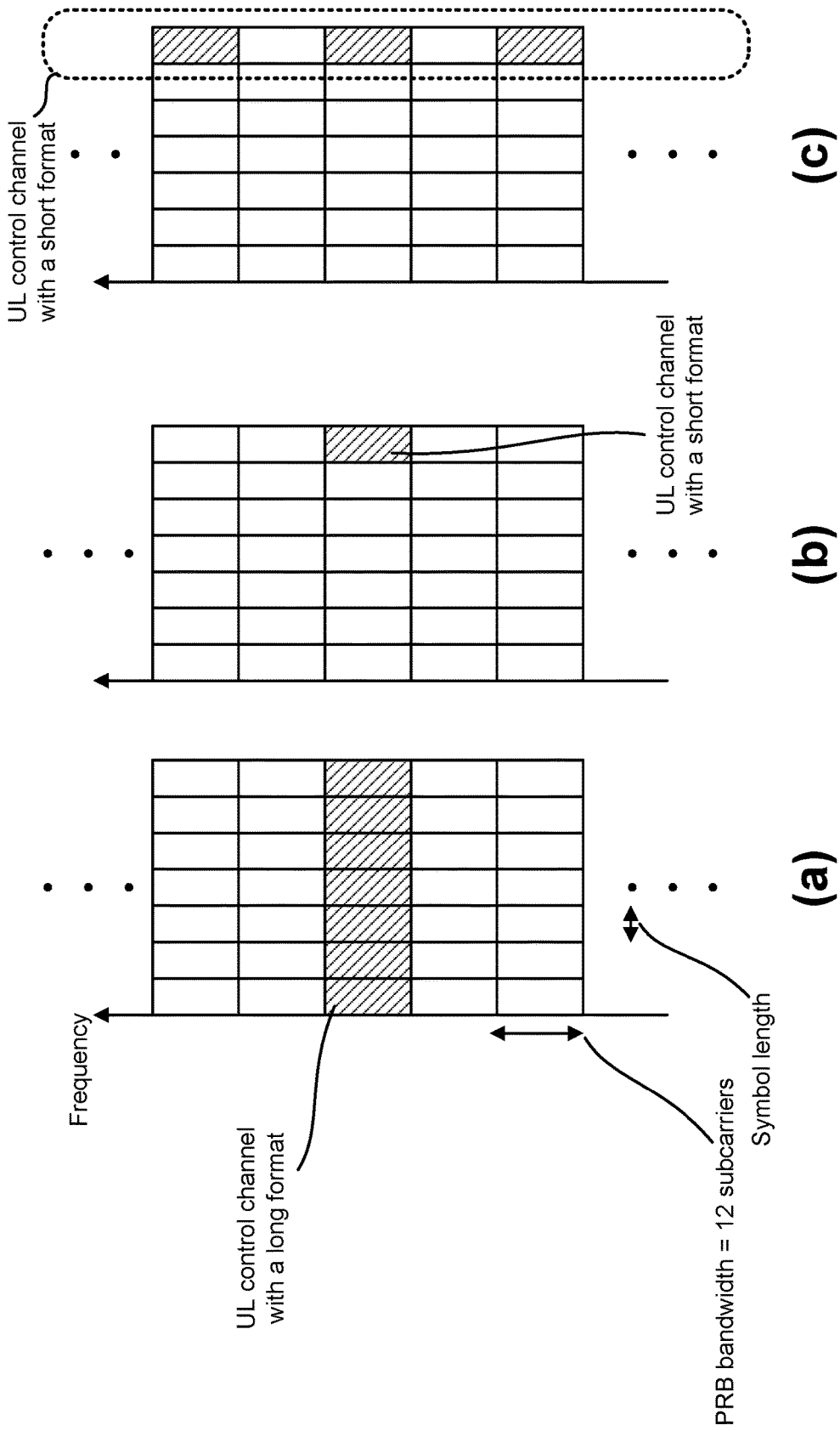
FIG. 10 shows examples of uplink (UL) control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 11:
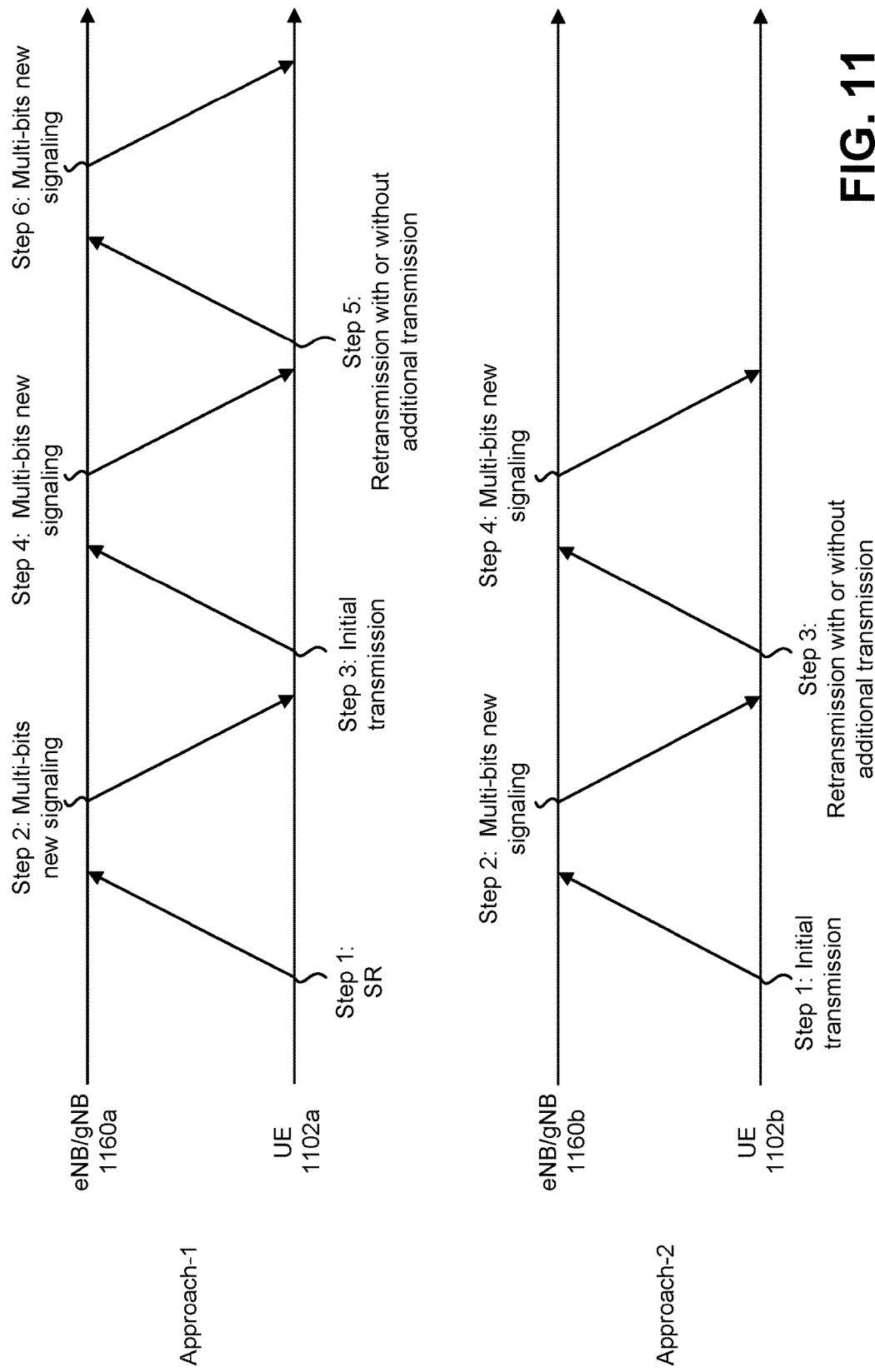
FIG. 11 illustrates examples of a first approach and a second approach for efficient uplink transmission signaling.

FIG. 11 illustrates examples of a first approach and a second approach for efficient uplink transmission signaling. Based on the information carried by (new) SR, multi-bits new signaling and pre-configuration, there can be many cases.

A first approach (Approach-1) may be used for resource configuration of a scheduling request (SR), an initial transmission, additional transmission and/or retransmission. In step 1, the UE 1102a may send a scheduling request (SR) to an eNB/gNB 1160a. For example, the SR may be transmitted on PUCCH resource(s) (i.e., SR resource(s) of PUCCH format 1, SR resource(s) of PUCCH format 3, SR resource(s) of UL control channel long format, and/or SR resource(s) of UL control channel short format).

In step 2, the eNB/gNB 1160a may send multi-bits new signaling to the UE 1102a. Here, the multi-bits new signaling may be transmitted on a Physical Downlink HARQ-ACK Indicator Channel (PDHICH). Here, the PDHICH is described for the sake of simple description, but a name of a physical downlink channel may be different from the PDHICH. For example, the PDHICH may be used for carrying information associated with HARQ-ACK in response to UL transmission (e.g., PUCCH transmission and/or SR transmission). Here, the SR transmission may be performed on PUCCH format 1, PUCCH format 3, UL control channel long format, and/or UL control channel short format. Namely, information associated with DL HARQ-ACK in response to UL transmission (e.g., PUCCH transmission and/or SR transmission) may be sent on the PDHICH.

In step 3, the UE 1102a may send an initial transmission to the eNB/gNB 1160a. For example, the UE 1102a may perform, based on a detection of PDHICH transmission in subframe n, the corresponding UL transmission (e.g., PUSCH transmission) in subframe n+k according to PDHICH information. Here, a value of k may be defined, in advance, by specifications. For example, a value of k may be different for FDD (Frequency Division Duplexing) and TDD (Time Division Duplexing). Namely, a value of k may be different for each of types of frame structure (e.g., a frame structure type 1 and a frame structure type 2). Also, a value of k may be set as subframe level, slot level, mini-slot level, and/or symbol level. Also, the gNB 1160a may configure a value of k by using the dedicated RRC signal.

Here, a PDHICH resource may be identified an index (e.g. an index pair of a time resource, a frequency resource, a group number, and/or a sequence index). For example, for UL transmission (e.g., PUCCH transmission, and/or SR transmission) in a subframe n, the UE 1102a may determine, based on UL resource (e.g., SPS resource and/or PUCCH resource), the corresponding PDHICH resource in a subframe n+p.

Also, for UL transmission (e.g., PUCCH transmission, and/or SR transmission) in a subframe n, the UE 1102a may determine, based on an offset value that is configured by the gNB 1160a, the corresponding PDHICH resource in a subframe n+p. Here, a value of p may be specified, in advance, by specifications. And, a value of p may be different for FDD and TDD. Namely, a value of p may be different for each of types of frame structure (e.g., a frame structure type 1 and a frame structure type 2). Here, a value of p may be set as subframe level, slot level, mini-slot level, and/or symbol level. Also, the gNB 1160a may configure a value of p by using the dedicated RRC signal.

As above mentioned, an index of SPS resource (i.e., the PRB index of SPS resource) may be configured and/or indicated by the gNB 1160a using the RRC signal and/or DCI format. And, a first correspondence (a first association) of the index of PDHICH resource and the index of SPS resource may be defined and/or configured. Namely, the UE 1102a determine, based on the first correspondence, the PDHICH resource (i.e., the index of PDHICH) for UL transmission (e.g., PUCCH transmission and/or SR transmission).

Also, a second correspondence (association) of the index of PDHICH resource and the index of PUCCH resource may be defined and/or configured. And, the UE 1102a determine, based on the second correspondence, the PDHICH resource (i.e., the index of PDHICH) for UL transmission (e.g., PUCCH transmission and/or SR transmission). Namely, the UE 1102a may determine the PDHICH resource according to the first correspondence and/or the second correspondence.

Also, an offset value for the first correspondence may be configured by the gNB 1160a using the dedicated RRC signal. Also, an offset value for the second correspondence may be configured by the gNB 1160a using the dedicated RRC signal.

In step 4, the eNB/gNB 1160a may respond with additional multi-bits new signaling. In step 5, the UE 1102a may send a retransmission with or without additional transmission. In step 6, the eNB/gNB 1160a may respond with multi-bits new signaling.

A second approach may be used for resource configuration of an initial transmission, additional transmission and/or retransmission. In step 1, the UE 1102b may send an initial transmission to the eNB/gNB 1160b. In step 2, the eNB/gNB 1160b may respond additional multi-bits new signaling. In step 3, the UE 1102b may send a retransmission with or without additional transmission. In step 4, the eNB/gNB 1160b may respond with multi-bits new signaling.

In an implementation (case 1), MCS, numerology, antenna port, precoding may be pre-configured before step 1. Here, for URLLC data transmission, only a single antenna port may be used. And, the number (index) of the antenna port used for URLLC transmission may be configured by using the dedicated RRC signal and/or specified, in advance, by specifications. In an implementation (case 1.1), only one resource pool (for initial transmission, retransmission and/or additional transmission) may be pre-configured before step 1. For example, the gNB may configure one resource pool (e.g., PUSCH resource) by using the dedicated RRC signal. In this case, the UE 1102 knows the location of the resource (e.g., periodicity, time offset, resource block assignment and hopping resource allocation). The UE 1102 can use the configured one resource pool (i.e., the configured one resource) for initial transmission, retransmission and/or additional transmission. Namely, the UE 1102 may always use, based on a detection of the PDHICH information, the configured resource for initial transmission, retransmission, and/or additional transmission.

In an implementation (case 1.1.1), the SR resource may be preconfigured. In this case, the UE 1102 has its own SR resource (e.g., periodicity, offset, etc.) and will send a scheduling request before the data transmission.

In the case where there is no additional transmission, the procedure may be implemented as follows. In a first step (step 1a), after the TB arrives, the UE 1102 may use the next available SR resource to send a scheduling request (SR) to the eNB/gNB 1160. For example, SR resource(s) of PUCCH format 1 may be used for only transmitting a positive SR (i.e., requesting UL-SCH resources for initial transmission). Also, SR resource(s) of PUCCH format 3 may be used for only transmitting a positive SR and/or a negative SR (i.e., requesting and/or not requesting UL-SCH resources for initial transmission). Also, SR resource(s) of UL control channel long format and/or UL control channel short format may be used for transmitting multi-bit SR. In a second step (step 2a), after receiving and decoding the SR, the eNB/gNB 1160 sends the new signaling to the UE 1102. In this case, the new signal can be a one-bit trigger (e.g., '1' means that the UE 1102 can transmit the data at the pre-configured resource). Namely, for example, one-bit information used for granting (triggering, permitting) PUSCH transmission may be transmitted on PDHICH. The timing may be determined by the eNB/gNB 1160, which may be based on some scheduling considerations. For example, as above mentioned, for uplink transmission (e.g., PUCCH transmission, and/or SR transmission) in a subframe n, the UE 1102a may determine the corresponding PDHICH resource in a subframe n+p. Here, as above mentioned, the UE 1102a determine the PDHICH resource based on SPS resource, PUCCH resource, and/or offset value which is configured by the gNB 1160.

In a third step (step 3a), after receiving and decoding the new signaling, the UE 1102 may send out the initial transmission at the pre-configured resource. The timing may be derived from the timing of the new signaling. If UE 1102 does not receive the new signaling for X scheduling units after it sends out the SR, it will send out the initial transmission at the next pre-configured resource. X is determined by the latency requirement.

In a fourth step (step 4a), if the eNB/gNB 1160 receives and decodes the TB successfully, it will send the ACK-like new signaling (e.g. '1') to the UE 1102, which indicates a successful transmission. Otherwise, it will send the NACK-like new signaling (e.g. '0') to the UE 1102, which triggers a retransmission. Namely, for example, one-bit information used for granting (triggering, permitting) and/or not granting (not triggering, not permitting) PUSCH transmission may be transmitted on PDHICH. On the other hand, the ACK-like new signaling may also trigger a new transmission for another TB if the UE 1102 sent another SR before.

In a fifth step (step 5a), if the UE 1102 receives the ACK-like new signaling, the UE 1102 will not do retransmission. In addition, if the UE 1102 has another TB to transmit and has sent out the corresponding SR before, it will transmit the new TB at the pre-configured resource. If the UE 1102 receives the NACK-like new signaling, the UE 1102 may retransmit the TB at the pre-configured resource no matter whether there is a new TB to transmit or not. In other words, the new TB will not be transmitted until the previous TB has been received and decoded successfully by eNB/gNB 1160. In a sixth step (step 6a), step 4a or step 1a may be repeated.

To summarize this implementation, if the new signaling is triggered by a SR, then it is a simplified UL grant. If the new signaling is triggered by a transmission/retransmission, then it is an AKC/NACK and/or a simplified grant for new transmission or retransmission.

In the case where there is additional transmission, the procedure may be implemented as follows. There can be an extended version with a multi-bits new signaling. One more bit can be added to the new signaling described above to indicate the usage of an additional resource. Since there is only one resource pool, the additional transmission will use the same resource which is pre-configured for initial transmission and retransmission. For example, after receiving the multi-bits new signaling '11', the UE 1102 knows that it can transmit at the next two pre-configured resources. It is equivalent to a granted initial transmission and an immediate retransmission without NACK. After receiving the multi-bits new signaling '10', he UE 1102 knows it can only transmit at the next one pre-configured resource. The similar rule is applied to retransmission when he UE 1102 receives the new signaling '01' or '00'. Moreover, more bits can be added to the new signaling to indicate more additional resources. The additional bits can be used to indicate the number of additional resources or a bitmap.

In another implementation (case 1.1.2), SR is not used. In this case, the UE 1102 does not send a scheduling request (SR) before the initial transmission. When the TB arrives, the UE 1102 will use the pre-configured resource to send the initial transmission to the eNB/gNB 1160. The rest of the steps in this implementation are the same as step 4a and step 5a as described above in case 1.1.1. In summary of this implementation, the initial transmission is grant-free while the retransmission is grant-based.

In yet another implementation (case 1.1.3), the multi-bits new SR is pre-configured. Here, the multi-bits SR may be transmitted on SR resource(s) of PUCCH format 1, SR resource(s) of PUCCH format 3, SR resource(s) of UL control channel long format, and/or UL control channel short format For example, the SR may indicate the service or requirement (e.g., eMBB or URLLC). In an example, one-bit '1' can indicate the SR is from a URLLC service. Then, the eNB/gNB 1160 knows the service is much more important than any other service and it should guarantee the latency requirement and send out the multi-bits new signaling to the corresponding UE 1102. Namely, one or more SR bits used for requesting UL-SCH resources for new transmission of each of the services and/or the requirements (e.g., eMBB service and/or URLLC service) may be defined. Namely, each value of one or more SR bits may indicate requesting of UL-SCH resources for new transmission of each of the services and/or the requirements.

Also, for example, the SR may indicate the priority level of the transmission. Different URLLC services may have different requirements for latency and reliability. A multi-bits SR can indicate the priority level of the transmission. For example, a value '00' of multi-bits SR may indicate the highest priority; a value '01' of multi-bits SR may indicate the second priority; a value '10' of multi-bits SR may indicate the third priority; and a value '11' of multi-bits SR may indicate the lowest priority. Then, the eNB/gNB 1160 knows how to schedule the transmissions based on the priority levels and may send out the multi-bits new signaling above. For example, the requested transmission with the highest priority should be allocated with the immediate next pre-configured resource. For scheduling requests with the same priority level, the eNB/gNB 1160 can adopt a round-robin or random selection. Namely, one or more SR bits used for requesting UL-SCH resources for UL transmission of each of the priority level may be defined. Namely, each value of one or more SR bits may indicate a requesting of UL-SCH resources for new transmission of each of the priority level.

Also, for example, the SR may indicate a buffer status. The buffer status (e.g., a buffer status reporting procedure) may be used to provide the serving gNB with information about the amount of data available for transmission in the UL buffers associated with the MAC entity. Namely, the buffer status may be used to provide the gNB with the information about the amount of data available for transmission in the UL buffers. The Buffer Size may identify the total amount of data available across all logical channels of a logical channel group after all MAC PDUs for the transmission (e.g., the transmission time interval) have been built. Different transmissions may have different buffer sizes. A multi-bits SR can indicate the coarse buffer size. For example, a value '00' of multi-bits SR may indicate a buffer size<=x1; a value '01' of multi-bits SR may indicate x1<buffer size<=x2; a value '10' of multi-bits SR may indicate x2<buffer size<=x3; and a value '11' of multi-bits SR may indicate buffer size>x3. Then, the eNB/gNB 1160 may allocate a corresponding number of resources according to the buffer size and may send out the corresponding multi-bits new signaling. Namely, one or more SR bits used for indicating information on the buffer status may be defined. Namely, each value of one or more SR bits may indicate each of amount of data available for transmission in the UL buffers.

Also, for example, the SR may indicate the number of required resources (i.e., the required amount of UL resources). Different transmissions may need different numbers of resources due to the consideration of MCS/buffer size or repetition for reliability. A multi-bits SR can indicate the number of required resources. For example, a value '00' of multi-bits SR may indicate no additional resource is required; a value '01' of multi-bits SR may indicate one additional resource is required; a value '10' of multi-bits SR may indicate two additional resources are required; and a value '11' of multi-bits SR may indicate three additional resources are required. Then, the eNB/gNB 1160 may allocate corresponding number of resources according the request and may send out the corresponding multi-bits new signaling. It should be noted that the multi-bits new signaling can always rewrite the request. Namely, one or more SR bits used for indicating the amount of UL resources may be defined. Namely, each value of one or more SR bits may indicate each of amount of UL resources.

Also, for example, the SR may be used for a requesting of UL resource of a numerology (i.e., SCS, e.g. 15 kHz, 30 kHz and/or 60 kHz) for UL transmission (e.g., new transmission and/or retransmission). Here, the UL resource may include the SPS resource, and/or the DS resource. According to the assumption of case 1, one or more numerologies are pre-configured (e.g. configured by the gNB using the RRC signal). The UE 1102 may request UL transmission on UL resource with a different numerology. A multi-bits SR can indicate the required numerology of UL transmission. For example, a value '00' of multi-bits SR may indicate requesting of UL resources of 15 kHz SCS for UL transmission; a value '01' of multi-bits SR may indicate requesting of UL resources of 30 kHz SCS for UL transmission; a value '10' of multi-bits SR may indicate requesting of UL resources of 60 kHz SCS for UL transmission; and a value '11' of multi-bits SR may indicate requesting of UL resources of 120 kHz SCS for UL transmission. There should be an additional bit in the multi-bits new signaling above to tell the UE 1102 whether such a numerology is allowed or not. For example, the additional bit '1' indicates the UE 1102 can transmit by using the requested numerology. Otherwise, the UE 1102 uses the pre-configured default numerology. Namely, one or more SR bits used for indicating the numerology (i.e., SCS) for UL resources may be defined. Namely, each value of one or more SR bits may indicate each of numerology (i.e., SCS) for UL resources. Here, the number of SR bit(s) may be determined based on the configured one or more numerologies. Namely, the UE 1102 may determine the number of SR bit(s) based on the information configuring the one or more numerologies. For example, in a case that only 15 kHz SCS is configured as the numerology, the number of SR bits may be one bit (i.e., one bit SR may be used). And, in a case that 15 kHz SCS and 30 KHz are configured as the numerologies, the number of SR bits may be two bits (i.e., two bits SR may be used). Also, in a case that 15 kHz SCS, 30 KHz and 60 KHz are configured as the numerologies, the number of SR bits may be two bits (i.e., two bits SR may be used). Also, the interpretation of a value of one or more SR bits may be determined based on the configured one or more numerologies. Namely, the UE 1102 may determine, based on the configured numerologies, a correspondence of the value of one or more SR bits and the requested numerologies. For example, in a case that only 15 kHz SCS is configured, a value '1' of SR bit may indicate requesting of UL resource of 15 kHz SCS for UL transmission. And, for example, in a case that only 60 kHz SCS is configured, a value '1' of SR bit may indicate requesting of UL resource of 60 kHz SCS for UL transmission. Also, for example, in a case that 15 kHz SCS and 30 kHz SCS are configured, a value '01' of SR bits may indicate requesting of UL resource of 15 kHz SCS for UL transmission. And, in this case, a value '10' of SR bits may indicate requesting of UL resource of 30 kHz SCS for UL transmission. Also, for example, in a case that 15 kHz SCS and 60 kHz SCS are configured, a value '01' of SR bits may indicate requesting of UL resource of 15 kHz SCS for UL transmission. And, in this case, a value '10' of SR bits may indicate requesting of UL resource of 60 kHz SCS for UL transmission. Also, for example, in a case that 30 kHz SCS and 60 kHz SCS are configured, a value '01' of SR bits may indicate requesting of UL resource of 30 kHz SCS for UL transmission. And, in this case, a value '10' of SR bits may indicate requesting of UL resource of 60 kHz SCS for UL transmission.

Also, for example, the SR may indicate the MCS of the requested transmission. According to the assumption of case 1, the MCS is pre-configured. The UE 1102 may request a different MCS. A multi-bits SR can indicate the MCS of the required transmission. There should be an additional bit in the multi-bits new signaling above to tell the UE 1102 whether such a MCS is allowed or not. For example, the additional bit '1' indicates the UE 1102 can transmit by using the requested MCS. Otherwise, the UE 1102 uses the pre-configured default MCS. It should be noted that the number of bits for all kinds of SRs above can be changed by eNB/gNB 1160 (e.g., MIB, SIB, RRC, DCI or MAC CE). The number of bits included in the SR may be determined by the number of choices provided to the UE 1102.

In another implementation (case 1.2), two resource pools (one is for initial transmission and/or additional transmission, while the other is for retransmission and/or additional transmission) are pre-configured before step 1. In this case, the UE 1102 knows the locations of these two kinds of resources (e.g. periodicity, time offset, resource block assignment and hopping resource allocation). The UE 1102 can use the initial transmission resource pool for initial transmission and retransmission resource pool for retransmission.

This implementation separates the initial transmission resource and the retransmission resource. Here, the initial transmission resource means that the resource is primarily used by initial transmission and may be used by additional transmission or retransmission. The retransmission resource means that the resource is primarily used by retransmission and may be used by additional transmission or initial transmission. The two resource pools can be time division multiplexed, frequency division multiplexed or both.

In an implementation (case 1.2.1), the SR resource is pre-configured. As described in case 1.1.1 above, the new transmission may wait until the previous transmission/retransmission is successful. Thus, the new transmission may fail to meet the latency requirement. That is a motivation to separate the initial transmission resource and the retransmission source. On the other hand, the retransmission resource can be shared by multiple groups of UEs 1102 since the retransmission may not happen frequently.

The multi-bits new signaling may contain two parts. Part 1 may correspond to an initial transmission while part 2 may correspond to retransmission. These two parts can be mapped into physical channels together or separately. At the UE 1102 side, there may be two logic buffer queues. One is for initial transmissions while the other is for retransmissions.

In the case where there is no additional transmission, the procedure may be implemented as follows. In a first step (step 1b), after the TB arrives, the UE 1102 will use the next pre-configured SR resource to send a scheduling request to the eNB/gNB 1160. The TB will be restored in the initial transmission buffer queue.

In a second step (step 2b), after receiving and decoding the SR, the eNB/gNB 1160 sends the new signaling with part 1 to trigger the initial transmission. In this case, the new signal can be a one-bit trigger (no matter what the bit is, the UE 1102 can transmit the data at the pre-configured resource). The timing is determined by the eNB/gNB 1160, which may be based on some scheduling considerations.

In a third step (step 3b), after receiving and decoding the new signaling with part 1, the UE 1102 sends out the initial transmission at the pre-configured resource. The timing is derived from the timing of the new signaling. If the UE 1102 does not receive the new signaling for X scheduling units after it sends out the SR, it will send out the initial transmission at the next pre-configured resource. X is determined by the latency requirement.

In a fourth step (step 4b), if the eNB/gNB 1160 receives and decodes the TB successfully, it will send the ACK-like new signaling part 1 (e.g. '1') to UE, which indicates a successful transmission and may also trigger a new transmission for another TB if the UE 1102 sent another SR before. Otherwise, it will send the NACK-like new signaling part 1 (e.g. '0') to the UE 1102, which indicates a retransmission is required. Thus, the eNB/gNB 1160 will send out the new signaling part 2 simultaneously or separately to indicate the grant of the retransmission and/or ACK/NACK of a previous retransmission. For example, new signaling part 2 with bit '1' indicates that the retransmission of the previous TB is successful (if there was such a retransmission before) and it is also the grant of the retransmission for the following TB in the retransmission buffer queue or the current TB which just failed for the initial transmission. On the other hand, the new signaling part 2 with bit '0' indicates that the retransmission of the previous TB failed and another retransmission is required. In this case, the UE 1102 cannot do retransmission for the following TB in the retransmission buffer queue or the current TB which just failed for the initial transmission.

In a fifth step (step 5a), if the UE 1102 receives the ACK-like new signaling part 1, the UE 1102 may clear the buffer of the current TB in the initial transmission buffer queue. If the UE 1102 receives the NACK-like new signaling part 1, the UE 1102 may move the buffer of the current TB from the initial transmission buffer queue into the retransmission buffer queue. In addition, no matter whether the received new signaling part 1 is ACK-like or NACK-like, if the UE 1102 has another TB to transmit and has sent out the corresponding SR before, it will transmit the new TB at the next pre-configured resource. If the UE 1102 receives the new signaling part 2 with bit '0', the UE 1102 may retransmit the previous TB in the retransmission buffer queue at the next pre-configured retransmission resource. Otherwise, the UE 1102 clears the buffer of the previous TB in the retransmission buffer queue and transmits the immediate following TB in the retransmission buffer queue (which also includes the TB just moved from the initial transmission buffer queue due to the failure of the initial transmission). However, if the retransmission buffer queue is empty, there is no action corresponding to the new signaling part 2. In a sixth step (step 6b), step 4b or step 1b may be repeated.

As an example, the case with a processed initial transmission, a new coming TB and a processed retransmission is shown as following:

In the case where there is additional transmission, the procedure may be implemented as follows. There can be an extended version with additional transmission. One or more bits can be added to the new signaling part 1 and part 2 above to indicate the usage of an additional resource. The additional transmission for the same TB may be provided to enhance the reliability of the initial transmission or the retransmission or both. Since there are two resource pools, the additional transmission will use the resource pool which is pre-configured for initial transmission and/or the resource pool which is pre-configured for retransmission. Some examples of using additional transmissions are described in connection with FIGS. 12-14. In these examples, the resource pools are frequency division multiplexed. However, they can also be time division multiplexed or even spatial division multiplexed.

The remaining question is how to use additional bits to indicate the usage of additional transmission. The additional bits added to the new signaling part 1 and/or part 2 can be used as a simple trigger for the additional transmission at the pre-defined resource position or to indicate the number of additional resources at the pre-defined resource set or a bitmap of the pre-defined resource set.

In another implementation (case 1.2.2), the SR is not used. As described above in case 1.1.2, the retransmission is grant-based but it may conflict with the grant-free initial transmission since they use the same resource pool. Thus, it may be better to manage the retransmission in a separated resource pool. In this case, the UE 1102 does not send a scheduling request before the initial transmission. When the TB arrives, the UE 1102 will use the next pre-configured resource to send the initial transmission to the eNB/gNB 1160. The rest of the steps are the same as step 4b and step 5b in case 1.2.1.

Contention may happen in the initial transmissions but contention can be avoided in retransmissions since retransmissions are grant-based in a separate resource pool. Additional transmissions can be used or not, which is similar to case 1.2.1. An example where two UEs 1102 fail in the initial transmission and retransmissions are granted in the retransmission resource pool with additional transmissions in the initial transmission resource pool is described in connection with FIG. 15. To summarize, if the initial transmission is treated as a special SR, the case here (case 1.2.2) is equivalent to case 1.2.1.

In another implementation, (case 1.2.3), multi-bits new SR is pre-configured. This implementation can be the same as case 1.1.3.

In another implementation, (case 1.3), three or more resource pools may be pre-configured before step 1. Besides the initial transmission resource pool and the retransmission resource pool, one or more additional resource pools are pre-configured for additional transmission only. Comparing to case 1.2, more bits can be added to the new signaling part 1 and/or part 2 to indicate the usage of the additional resource pool/pools. The additional bits mentioned here can be used as a simple trigger for the additional transmission at the pre-defined resource position or to indicate the number of additional resources at the pre-defined resource set or a bitmap of the pre-defined resource set in the additional resource pool/pools. Other parts can be the same as case 1.2.

In another implementation, (case 1.4), no resource pool is pre-configured before step 1. In this case, the multi-bits new signaling needs to indicate the resource position exactly for granted transmission/retransmission.

In another implementation, (case 2), the MCS, numerology, antenna port, precoding (at least one of them) are not pre-configured before step 1 of the procedures above. In this case, the multi-bits new signaling needs to indicate the missing parameters for granted transmission/retransmission or whether the UE 1102 can reuse the parameter from other transmissions/services/measurements.

Figure 12:
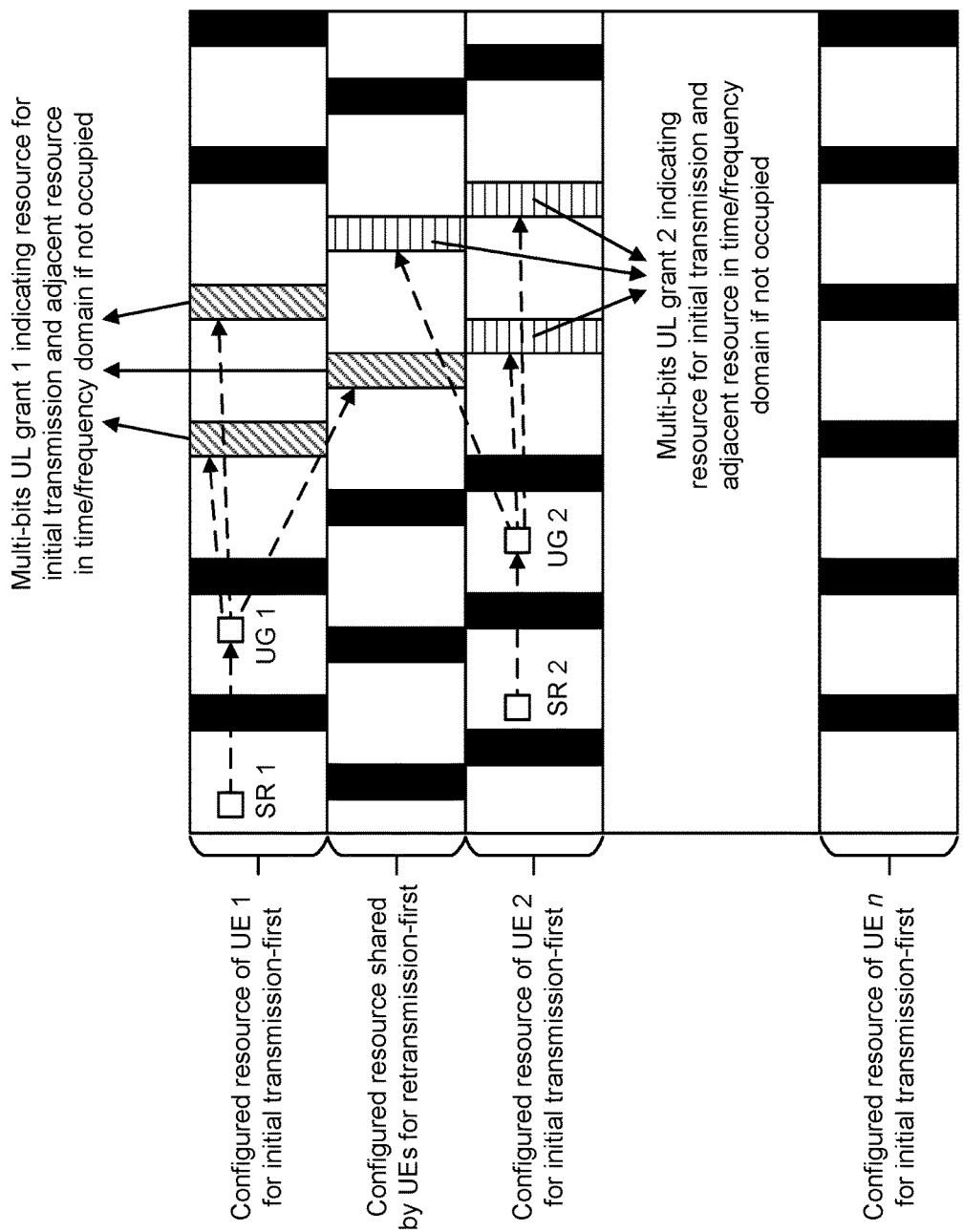
FIG. 12 is a first example illustrating an initial transmission with additional transmission.

FIG. 12 is a first example illustrating an initial transmission with additional transmission. This is an implementation of case 1.2.1 described in connection with FIG. 11.

In this example, each UE 102 has its own pre-configured initial transmission resource pool and shares the retransmission resource pool with other UE/UEs 102. Additional transmission can use the initial transmission resource pool and/or the retransmission resource pool if available. Here, an uplink grant (UG) is used instead of the new signaling part 1 since the new signaling part 1 serves as a simplified uplink grant.

In the configured resource of UE-1 for initial transmission, a scheduling request (SR-1) triggers an uplink grant (UG-1). The UG-1 is a multi-bits UL grant indicating resources for initial transmission and adjacent resources in time/frequency domain if not occupied.

In the configured resource of UE-2 for initial transmission, a scheduling request (SR-2) triggers an uplink grant (UG-2). The UG-2 is a multi-bits UL grant indicating resources for initial transmission and adjacent resources in time/frequency domain if not occupied.

Figure 13:
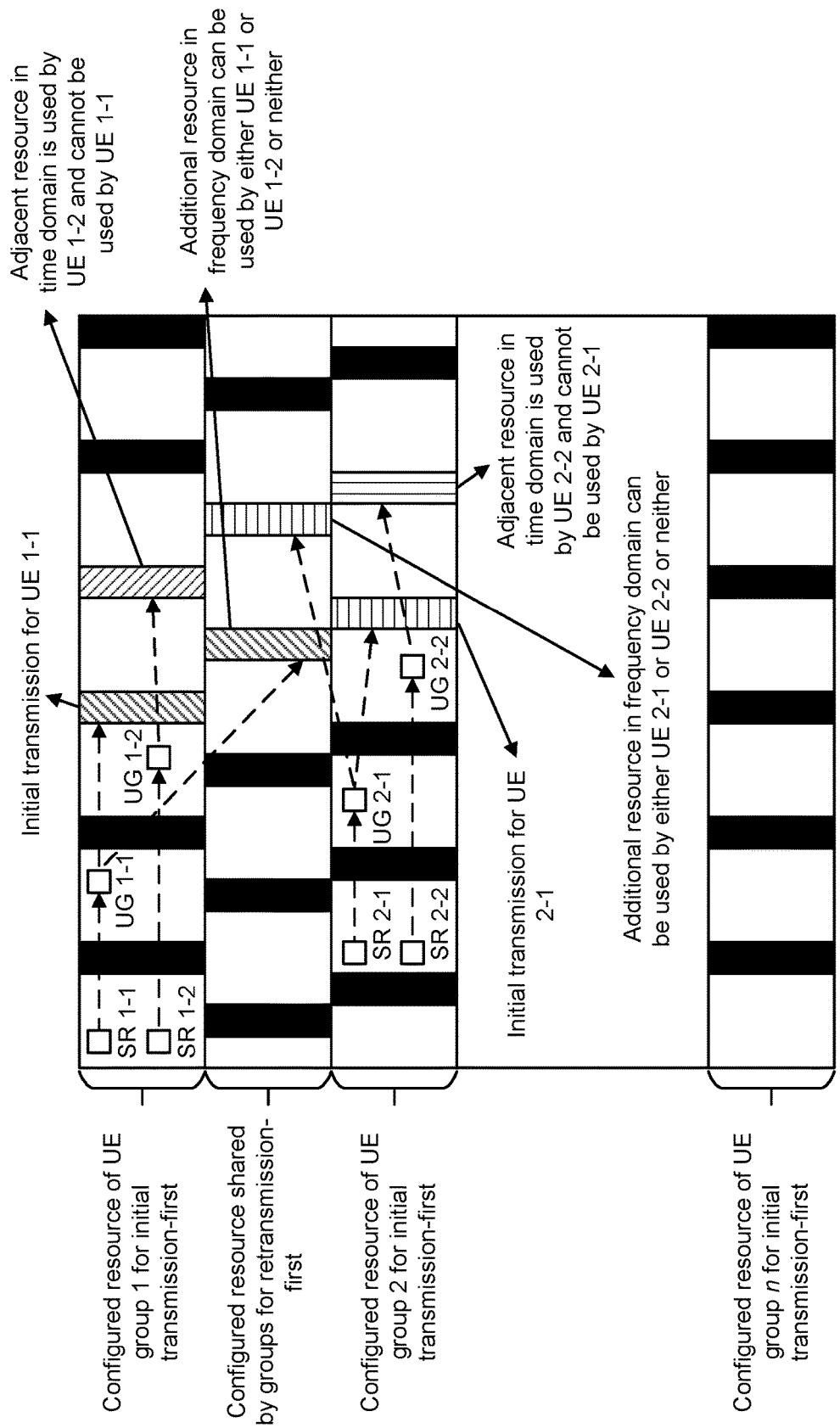
FIG. 13 is a second example illustrating an initial transmission with additional transmission.

FIG. 13 is a second example illustrating an initial transmission with additional transmission. This is an implementation of case 1.2.1 described in connection with FIG. 11.

In this example, the only difference from the example described in connection with FIG. 12 above is that an initial transmission pool can be shared by a group of UEs. A configured resource may be shared by groups of UEs for retransmission.

A first UE group (UE group 1) includes UE 1-1 and UE 1-2. In the configured resource of UE group 1 for initial transmission, a scheduling request (SR 1-1) triggers an uplink grant (UG 1-1) for UE 1-1. The UG 1-1 is a multi-bits UL grant indicating a resource for initial transmission for UE 1-1. The UG 1-1 also indicates an additional resource in frequency domain that can be used by either UE 1-1 or UE 1-2 or neither. A second scheduling request (SR-1-2) triggers an uplink grant (UG 1-2) for UE 1-2. The UG 1-2 is a multi-bits UL grant indicating a resource for initial transmission for UE 1-2. In this example, the adjacent resource in the time domain is used by UE 1-2 and cannot be used by UE 1-1.

A second UE group (UE group 2) includes UE 2-1 and UE 2-2. In the configured resource of UE group 2 for initial transmission, a scheduling request (SR 2-1) triggers an uplink grant (UG 2-1) for UE 2-1. The UG 2-1 is a multi-bits UL grant indicating a resource for initial transmission for UE 2-1. The UG 2-1 also indicates an additional resource in frequency domain that can be used by either UE 2-1 or UE 2-2 or neither. A second scheduling request (SR-2-2) triggers an uplink grant (UG 2-2) for UE 2-2. The UG 2-2 is a multi-bits UL grant indicating a resource for initial transmission for UE 2-2. In this example, the adjacent resource in the time domain is used by UE 2-2 and cannot be used by UE 2-1.

Figure 14:
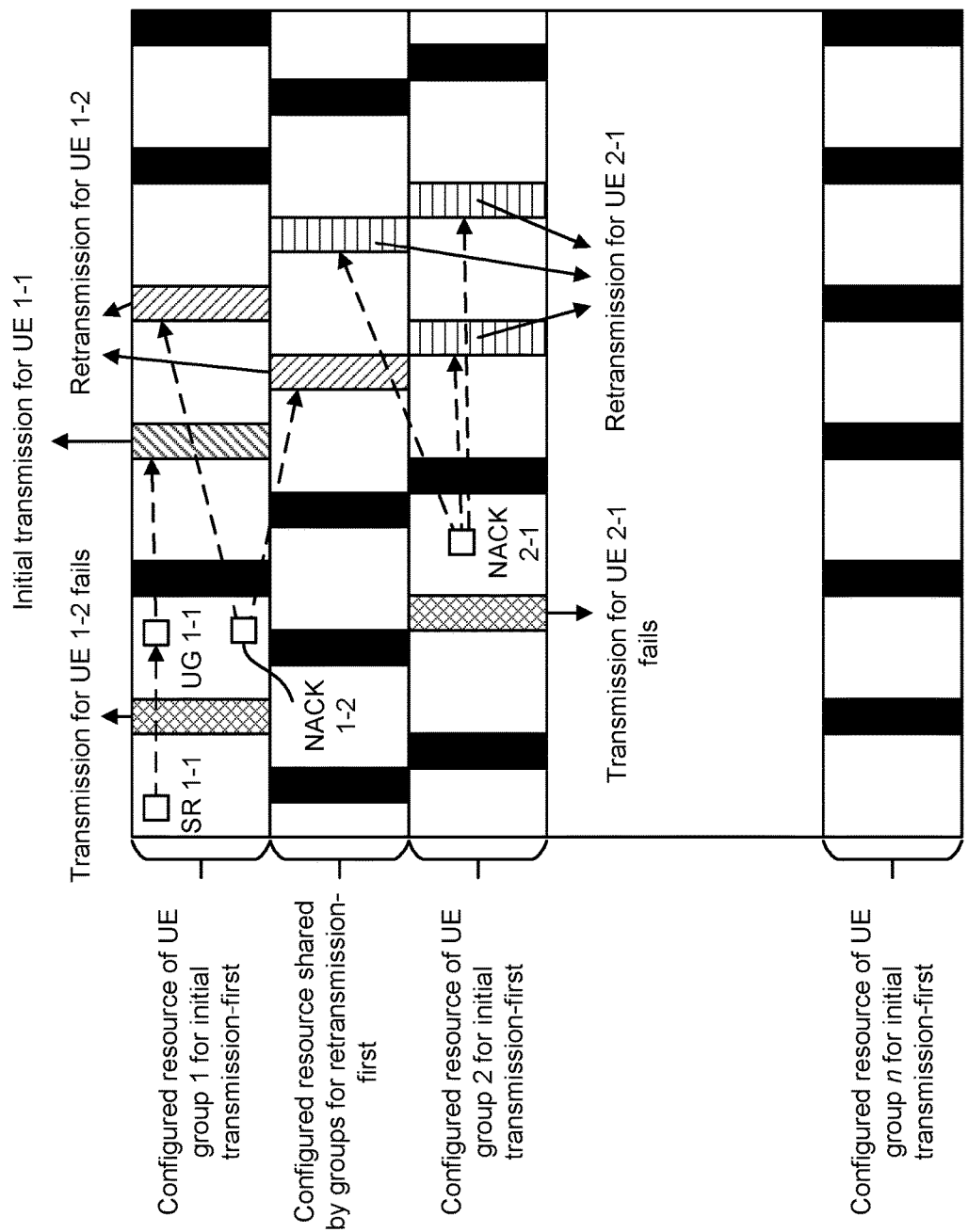
FIG. 14 is an example illustrating a retransmission with additional transmission

FIG. 14 is an example illustrating a retransmission with additional transmission. This is an implementation of case 1.2.1 described in connection with FIG. 11.

Additional transmission for retransmission can use the initial transmission resource pool and/or the retransmission resource pool if available. Here, 'NACK' is used instead of the new signaling part 2 since the new signaling part 2 in this example serves as a grant for the retransmission resource.

A first UE group (UE group 1) includes UE 1-1 and UE 1-2. In the configured resource of UE group 1 for initial transmission, a scheduling request (SR 1-1) triggers an uplink grant (UG 1-1) for UE 1-1. However, a transmission for UE 1-2 fails. The UG 1-1 is a multi-bits UL grant indicating a resource for initial transmission for UE 1-1. The NACK 1-2 for UE 1-2 indicates resources and adjacent resources in time/frequency domain for retransmission by UE 1-2.

A second UE group (UE group 2) includes UE 2-1 and UE 2-2. A transmission for UE 2-1 fails. A second scheduling request (SR-1-2) triggers an uplink grant (UG 1-2) for UE 1-2. The NACK 2-1 for UE 2-1 indicates resources and adjacent resources in time/frequency domain for retransmission by UE 2-1.

Figure 15:
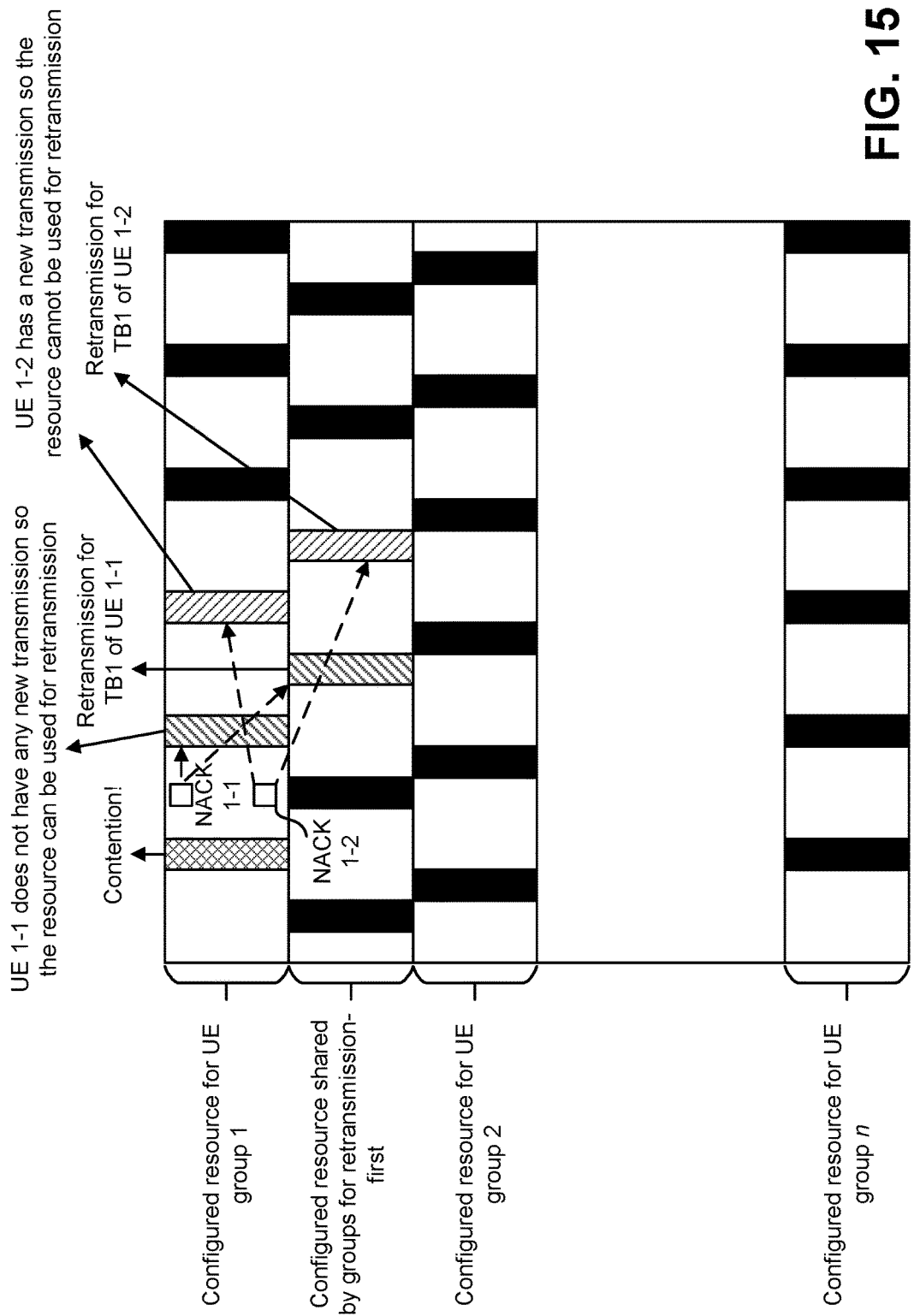
FIG. 15 is an example illustrating transmission without a scheduling request (SR)

FIG. 15 is an example illustrating transmission without a scheduling request (SR). This is an implementation of case 1.2.2 described in connection with FIG. 11.

In this case, a UE does not send a scheduling request (SR) before the initial transmission. When a transport block (TB) arrives, the UE will use the next pre-configured resource to send the initial transmission to the eNB/gNB.

In this example, two UEs (UE 1-1 and UE 1-2) fail in the initial transmission and retransmissions are granted in the retransmission resource pool with additional transmissions in the initial transmission resource pool.

A NACK 1-1 indicates resources and adjacent resources in time/frequency domain for retransmission by UE 1-1. In the configured resource for UE group 1, the UE 1-1 does not have any new transmission. Therefore, the resource can be used for retransmission. The shared resource may be used for retransmission for TB1 of UE 1-1.

A NACK 1-2 indicates resources and adjacent resources in time/frequency domain for retransmission by UE 1-2. In the configured resource for UE group 1, the UE 1-2 has a new transmission. Therefore, the resource cannot be used for retransmission. The shared resource may be used for retransmission for TB1 of UE 1-2.

Figure 16:
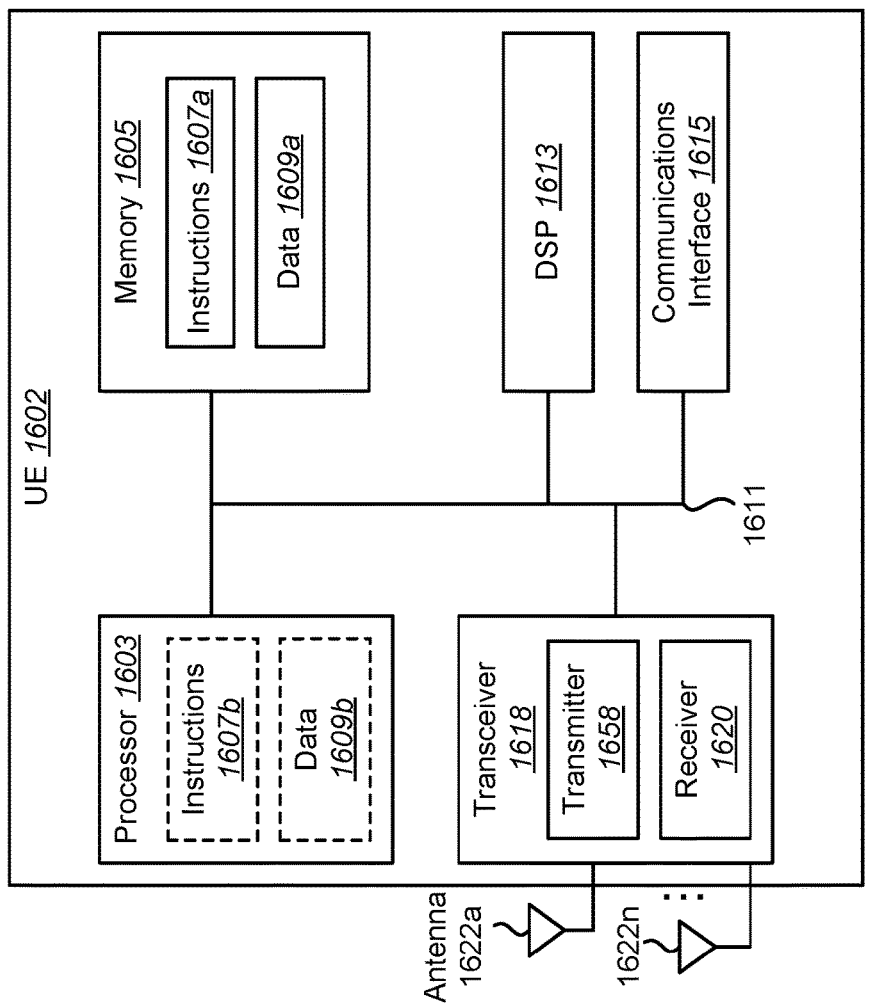
FIG. 16 illustrates various components that may be utilized in a UE.

FIG. 16 illustrates various components that may be utilized in a UE 1602. The UE 1602 described in connection with FIG. 16 may be implemented in accordance with the UE 102 described in connection with FIG. 1. The UE 1602 includes a processor 1603 that controls operation of the UE 1602. The processor 1603 may also be referred to as a central processing unit (CPU). Memory 1605, which may include read-only memory (ROM), random access memory (RAM), a combination of the two or any type of device that may store information, provides instructions 1607*a* and data 1609*a* to the processor 1603. A portion of the memory 1605 may also include non-volatile random access memory (NVRAM). Instructions 1607*b* and data 1609*b* may also reside in the processor 1603. Instructions 1607*b* and/or data 1609*b* loaded into the processor 1603 may also include instructions 1607*a* and/or data 1609*a* from memory 1605 that were loaded for execution or processing by the processor 1603. The instructions 1607*b* may be executed by the processor 1603 to implement the methods described above.

The UE 1602 may also include a housing that contains one or more transmitters 1658 and one or more receivers 1620 to allow transmission and reception of data. The transmitter(s) 1658 and receiver(s) 1620 may be combined into one or more transceivers 1618. One or more antennas 1622*a-n* are attached to the housing and electrically coupled to the transceiver 1618.

The various components of the UE 1602 are coupled together by a bus system 1611, which may include a power bus, a control signal bus and a status signal bus, in addition to a data bus. However, for the sake of clarity, the various buses are illustrated in FIG. 16 as the bus system 1611. The UE 1602 may also include a digital signal processor (DSP) 1613 for use in processing signals. The UE 1602 may also include a communications interface 1615 that provides user access to the functions of the UE 1602. The UE 1602 illustrated in FIG. 16 is a functional block diagram rather than a listing of specific components.

Figure 17:
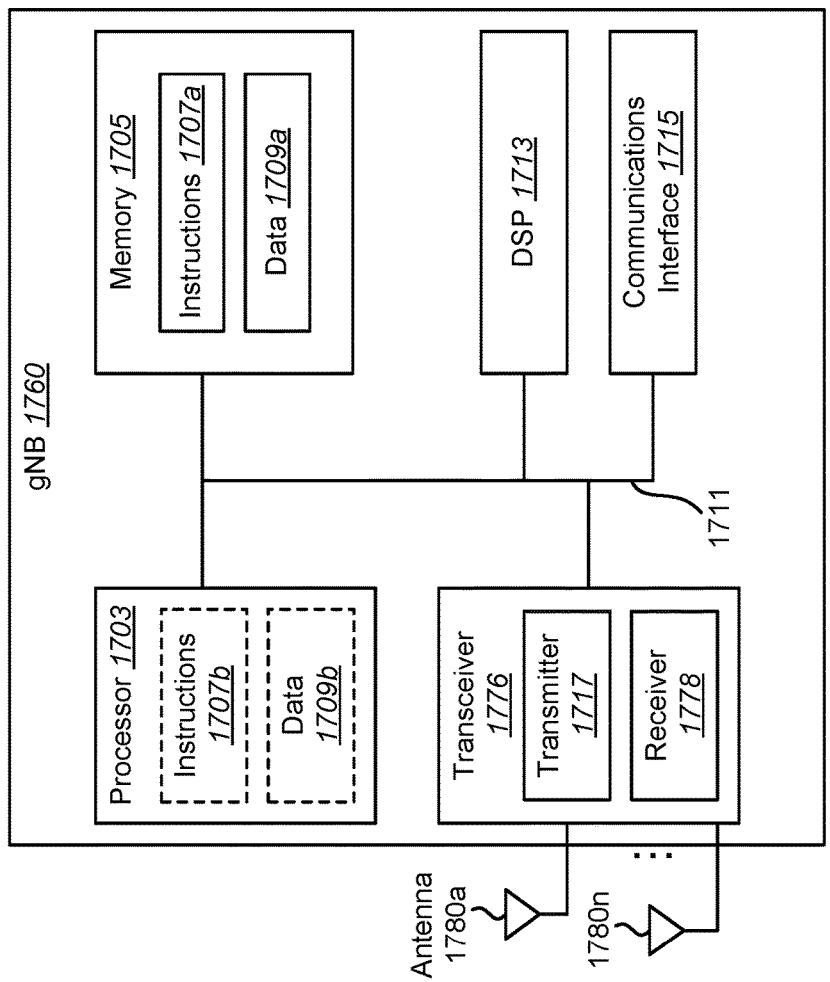
FIG. 17 illustrates various components that may be utilized in a gNB.

FIG. 17 illustrates various components that may be utilized in a gNB 1760. The gNB 1760 described in connection with FIG. 17 may be implemented in accordance with the gNB 160 described in connection with FIG. 1. The gNB 1760 includes a processor 1703 that controls operation of the gNB 1760. The processor 1703 may also be referred to as a central processing unit (CPU). Memory 1705, which may include read-only memory (ROM), random access memory (RAM), a combination of the two or any type of device that may store information, provides instructions 1707*a* and data 1709*a* to the processor 1703. A portion of the memory 1705 may also include non-volatile random access memory (NVRAM). Instructions 1707*b* and data 1709*b* may also reside in the processor 1703. Instructions 1707*b* and/or data 1709*b* loaded into the processor 1703 may also include instructions 1707*a* and/or data 1709*a* from memory 1705 that were loaded for execution or processing by the processor 1703. The instructions 1707*b* may be executed by the processor 1703 to implement the methods described above.

The gNB 1760 may also include a housing that contains one or more transmitters 1717 and one or more receivers 1778 to allow transmission and reception of data. The transmitter(s) 1717 and receiver(s) 1778 may be combined into one or more transceivers 1776. One or more antennas 1780*a-n* are attached to the housing and electrically coupled to the transceiver 1776.

The various components of the gNB 1760 are coupled together by a bus system 1711, which may include a power bus, a control signal bus and a status signal bus, in addition to a data bus. However, for the sake of clarity, the various buses are illustrated in FIG. 17 as the bus system 1711. The gNB 1760 may also include a digital signal processor (DSP) 1713 for use in processing signals. The gNB 1760 may also include a communications interface 1715 that provides user access to the functions of the gNB 1760. The gNB 1760 illustrated in FIG. 17 is a functional block diagram rather than a listing of specific components.

Figure 18:
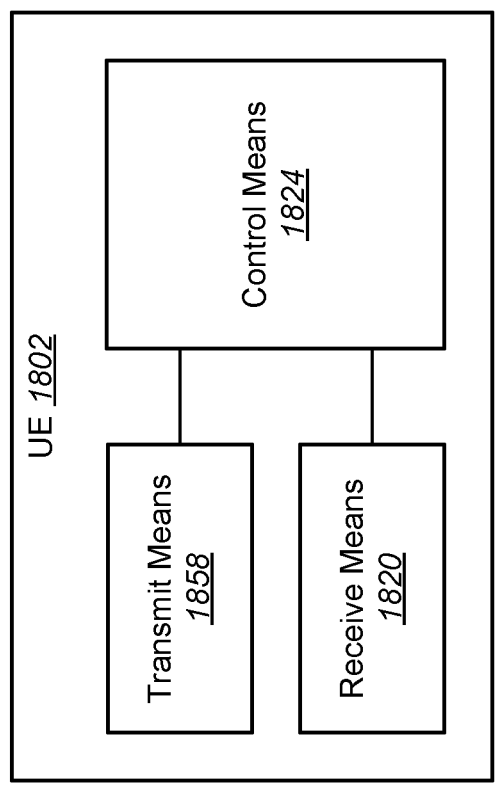
FIG. 18 is a block diagram illustrating one implementation of a UE in which systems and methods for URLLC operations may be implemented.

FIG. 18 is a block diagram illustrating one implementation of a UE 1802 in which systems and methods for URLLC operations may be implemented. The UE 1802 includes transmit means 1858, receive means 1820 and control means 1824. The transmit means 1858, receive means 1820 and control means 1824 may be configured to perform one or more of the functions described in connection with FIG. 1 above. FIG. 16 above illustrates one example of a concrete apparatus structure of FIG. 18. Other various structures may be implemented to realize one or more of the functions of FIG. 1. For example, a DSP may be realized by software.

Figure 19:
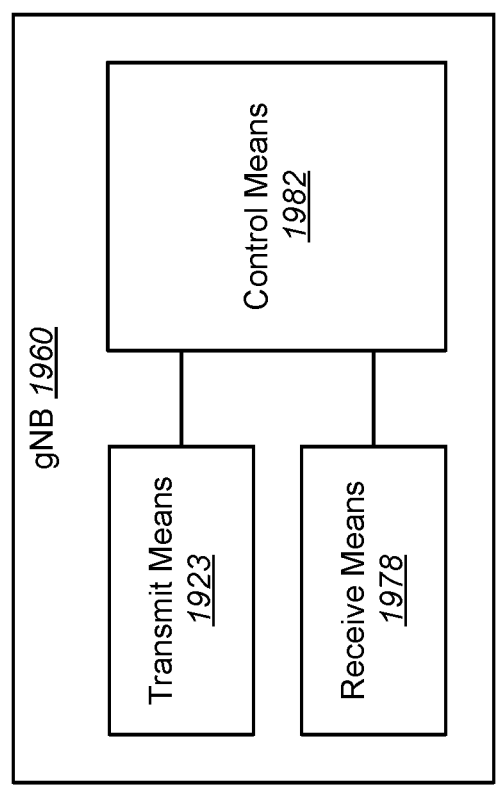
FIG. 19 is a block diagram illustrating one implementation of a gNB in which systems and methods for URLLC operations may be implemented.

FIG. 19 is a block diagram illustrating one implementation of a gNB 1960 in which systems and methods for URLLC operations may be implemented. The gNB 1960 includes transmit means 1917, receive means 1978 and control means 1982. The transmit means 1917, receive means 1978 and control means 1982 may be configured to perform one or more of the functions described in connection with FIG. 1 above. FIG. 17 above illustrates one example of a concrete apparatus structure of FIG. 19. Other various structures may be implemented to realize one or more of the functions of FIG. 1. For example, a DSP may be realized by software.

Figure 20:
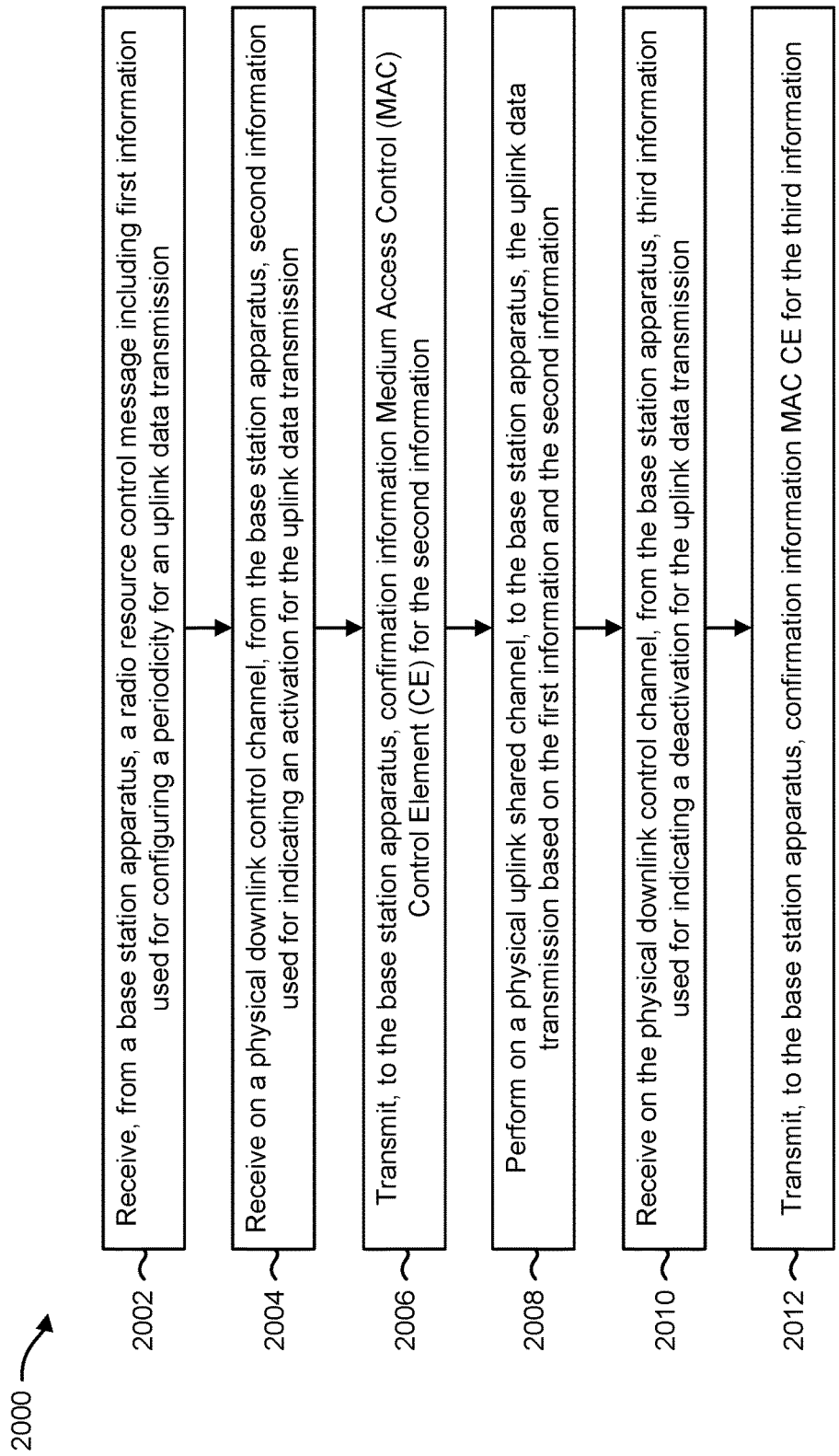
FIG. 20 is a flow diagram illustrating a communication method of a UE.

FIG. 20 is a flow diagram illustrating a communication method 2000 of a user equipment (UE) 102. The UE 102 may receive 2002, from a base station apparatus (gNB) 160, a radio resource control message including first information used for configuring a periodicity for an uplink data transmission. The UE 102 may also receive 2004 on a physical downlink control channel, from the base station apparatus, second information used for indicating an activation for the uplink data transmission. The UE 102 may further transmit 2006, to the gNB 160, confirmation information Medium Access Control (MAC) Control Element (CE) for the second information. The UE 102 may additionally perform 2008 on a physical uplink shared channel, to the gNB 160, the uplink data transmission based on the first information and the second information. The UE 102 may also receive 2010 on the physical downlink control channel, from the gNB 160, third information used for indicating a deactivation for the uplink data transmission. The UE 102 may further transmit 2012, to the gNB 160, confirmation information MAC CE for the third information. A MAC protocol data unit subheader with the same index of logical channel identifier (LCID) may be used for identifying the confirmation information MAC CE for the second information and the confirmation information MAC CE for the third information.

Figure 21:
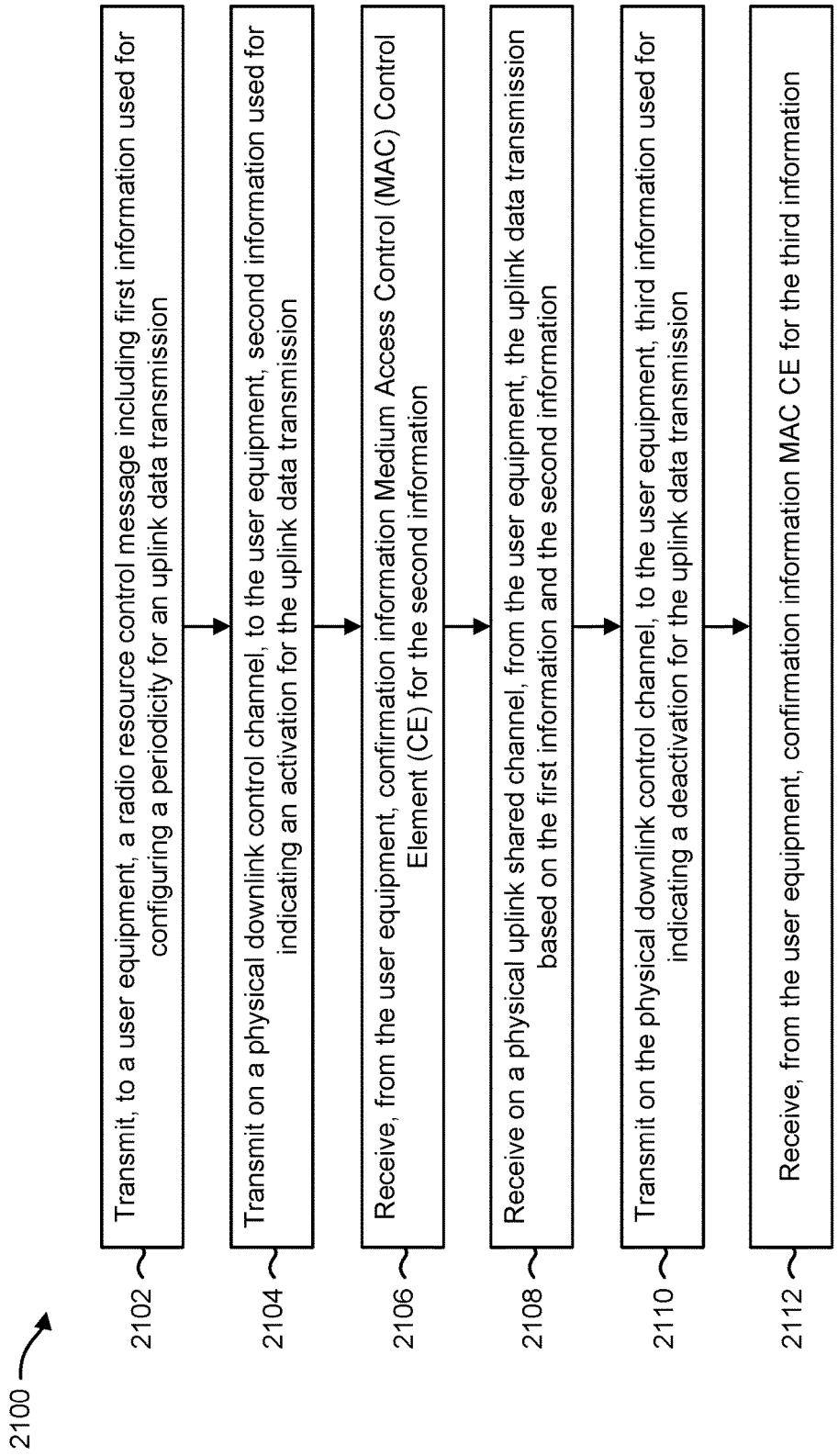
FIG. 21 is a flow diagram illustrating a communication method of a gNB.

FIG. 21 is a flow diagram illustrating a communication method 2100 of a base station apparatus (gNB) 160. The gNB 160 may transmit 2102, to a user equipment (UE) 102, a radio resource control message including first information used for configuring a periodicity for an uplink data transmission. The gNB 160 may also transmit 2104 on a physical downlink control channel, to the UE 102, second information used for indicating an activation for the uplink data transmission. The gNB 160 may further receive 2106, from the UE 102, confirmation information Medium Access Control (MAC) Control Element (CE) for the second information. The gNB 160 may additionally receive 2108 on a physical uplink shared channel, from the UE 102, the uplink data transmission based on the first information and the second information. The gNB 160 may also transmit 2110 on the physical downlink control channel, to the UE 102, third information used for indicating a deactivation for the uplink data transmission. The gNB 160 may further receive 2112, from the UE 102, confirmation information MAC CE for the third information. A MAC protocol data unit subheader with the same index of logical channel identifier (LCID) is used for identifying the confirmation information MAC CE for the second information and the confirmation information MAC CE for the third information The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) that communicates with a base station apparatus, comprising:
   receiving circuitry configured to receive a radio resource control (RRC) message comprising first information used for configuring a periodicity,
   the receiving circuitry configured to receive a RRC message comprising second information used for configuring a numerology,
   the receiving circuitry configured to detect in a common search space, a physical downlink control channel for a downlink control information (DCI) format with cyclic redundancy check (CRC) scrambled by a first radio network identifier (RNTI), the first RNTI being different from a Cell-RNTI (C-RNTI) and a semi-persistent scheduling C-RNTI, the first RNTI being used for indicating an activation and a deactivation for an uplink data transmission on a physical uplink shared channel (PUSCH) based on the periodicity and the numerology; and
   transmitting circuitry configured to transmit confirmation information Medium Access Control (MAC) Control Element (CE) in a case that third information used for indicating the activation for the uplink data transmission on the PUSCH is comprised in the DCI format with the CRC scrambled by the first RNTI,
   the transmitting circuitry configured to perform, based on a detection of the DCI format comprising the third information, the uplink data transmission on the PUSCH based on the periodicity and the numerology, wherein
   the transmitting circuitry is configured to transmit confirmation information MAC CE in a case that fourth information used for indicating the deactivation for the uplink data transmission on the PUSCH is comprised in the DCI format with the CRC scrambled by the first RNTI, and the confirmation information MAC CE for the DCI format comprising the third information is identified by a MAC protocol data unit (MAC PDU) subheader with a logical channel identifier (LCID), the confirmation information MAC CE for the DCI format comprising the fourth information is identified by the MAC PDU subheader with the LCID, and the same index of the LCID is used for the confirmation information MAC CE for the DCI format comprising the third information and the confirmation information MAC CE for the DCI format comprising the fourth information.

2. A base station apparatus that communicates with a user equipment (UE), comprising:

transmitting circuitry configured to transmit a radio resource control (RRC) message comprising first information used for configuring a periodicity, the transmitting circuitry configured to transmit a RRC message comprising second information used for configuring a numerology, the transmitting circuitry configured to transmit in a common search space of a physical downlink control channel, a downlink control information (DCI) format with cyclic redundancy check (CRC) scrambled by a first radio network identifier (RNTI), the first RNTI being different from a Cell-RNTI (C-RNTI) and a semi-persistent scheduling C-RNTI, the first RNTI being used for indicating an activation and a deactivation for an uplink data transmission on a physical uplink shared channel (PUSCH) based on the periodicity and the numerology; and receiving circuitry configured to receive confirmation information Medium Access Control (MAC) Control Element (CE) in a case that third information used for indicating the activation for the uplink data transmission on the PUSCH is comprised in the DCI format with the CRC scrambled by the first RNTI, the receiving circuitry configured to receive, based on a transmission of the DCI format comprising the third information, the uplink data transmission on the PUSCH based on the periodicity and the numerology, wherein the receiving circuitry is configured to receive confirmation information MAC CE in a case that fourth information used for indicating the deactivation for the uplink data transmission on the PUSCH is comprised in the DCI format with the CRC scrambled by the first RNTI, and the confirmation information MAC CE for the DCI format comprising the third information is identified by a MAC protocol data unit (MAC PDU) subheader with a logical channel identifier (LCID), the confirmation information MAC CE for the DCI format comprising the fourth information is identified by the MAC PDU subheader with the LCID, and the same index of the LCID is used for the confirmation information MAC CE for the DCI format comprising the third information and the confirmation information MAC CE for the DCI format comprising the fourth information.

3. A communication method of a user equipment that communicates with a base station apparatus, comprising:

receiving a radio resource control (RRC) message comprising first information used for configuring a periodicity;

receiving a RRC message comprising second information used for configuring a numerology;

detecting in a common search space, a physical downlink control channel for a downlink control information (DCI) format with cyclic redundancy check (CRC) scrambled by a first radio network identifier (RNTI), the first RNTI being different from a Cell-RNTI (C-RNTI) and a semi-persistent scheduling C-RNTI, the first RNTI being used for indicating an activation and a deactivation for an uplink data transmission on a physical uplink shared channel (PUSCH) based on the periodicity and the numerology;

transmitting confirmation information Medium Access Control (MAC) Control Element (CE) in a case that third information used for indicating the activation for the uplink data transmission on the PUSCH is comprised in the DCI format with the CRC scrambled by the first RNTI;

performing, based on a detection of the DCI format comprising the third information, the uplink data transmission on the PUSCH based on the periodicity and the numerology;

transmitting confirmation information MAC CE in a case that fourth information used for indicating the deactivation for the uplink data transmission on the PUSCH is comprised in the DCI format with the CRC scrambled by the first RNTI, wherein the confirmation information MAC CE for the DCI format comprising the third information is identified by a MAC protocol data unit (MAC PDU) subheader with a logical channel identifier (LCID), the confirmation information MAC CE for the DCI format comprising the fourth information is identified by the MAC PDU subheader with the LCID, and the same index of the LCID is used for the confirmation information MAC CE for the DCI format comprising the third information and the confirmation information MAC CE for the DCI format comprising the fourth information.

4. A communication method of a base station apparatus that communicates with a user equipment (UE), comprising:

transmitting a radio resource control (RRC) message comprising first information used for configuring a periodicity;

transmitting a RRC message comprising second information used for configuring a numerology;

transmitting in a common search space of a physical downlink control channel, a downlink control information (DCI) format with cyclic redundancy check (CRC) scrambled by a first radio network identifier (RNTI), the first RNTI being different from a Cell-RNTI (C-RNTI) and a semi-persistent scheduling C-RNTI, the first RNTI being used for indicating an activation and a deactivation for the uplink data transmission on a physical uplink shared channel (PUSCH) based on the periodicity and the numerology;

receiving confirmation information Medium Access Control (MAC) Control Element (CE) in a case that third information used for indicating the activation for the uplink data transmission on the PUSCH is comprised in the DCI format with the CRC scrambled by the first RNTI;

receiving, based on a transmission of the DCI format comprising the third information, the uplink data transmission on the PUSCH based on the periodicity and the numerology;

receiving confirmation information MAC CE in a case that fourth information used for indicating the deactivation for the uplink data transmission on the PUSCH is comprised in the DCI format with the CRC scrambled by the first RNTI, wherein the confirmation information MAC CE for the DCI format comprising the third information is identified by a MAC protocol data unit (MAC PDU) subheader with a logical channel identifier (LCID), the confirmation information MAC CE for the DCI format comprising the fourth information is identified by the MAC PDU subheader with the LCID, and the same index of the LCID is used for the confirmation information MAC CE for the DCI format comprising the third information and the confirmation information MAC CE for the DCI format comprising the fourth information.

* * * * *